(12) United States Patent
Tosaya

(10) Patent No.: US 6,323,893 B1
(45) Date of Patent: Nov. 27, 2001

(54) PORTABLE CONFERENCE CENTER

(75) Inventor: Carol Tosaya, Los Altos, CA (US)

(73) Assignee: Tidenet, Inc., Foster City, CA (US)

( * ) Notice: Subject to any disclaimer, the term of this patent is extended or adjusted under 35 U.S.C. 154(b) by 0 days.

(21) Appl. No.: 09/428,305

(22) Filed: Oct. 27, 1999

(51) Int. Cl.⁷ .................................................. H04N 7/14
(52) U.S. Cl. ................................. 348/14.08; 348/14.02; 348/14.1
(58) Field of Search .............................. 348/14, 15, 16, 348/17; 379/93.21, 93.23, 202; 370/260, 261; 709/204; 345/330; 455/556, 557, 566, 575

(56) References Cited

U.S. PATENT DOCUMENTS

| | | | |
|---|---|---|---|
| 5,550,754 | | 8/1996 | McNellye et al. ............... 364/514 A |
| 5,612,733 | * | 3/1997 | Flohr ....................... 348/14 |
| 5,682,196 | * | 10/1997 | Freeman ................... 348/15 |
| 5,922,047 | | 7/1999 | Newlin et al. ............... 709/217 |
| 6,011,579 | * | 1/2000 | Newlin .................... 348/15 |
| 6,020,916 | * | 2/2000 | Gerszberg et al. ............. 348/15 |
| 6,028,764 | * | 2/2000 | Richardson et al. ............. 361/681 |
| 6,037,970 | * | 3/2000 | Kondo .................... 348/15 |
| 6,075,571 | * | 6/2000 | Kuthyar et al. ............... 348/15 |
| 6,108,028 | * | 8/2000 | Sakarbo et al. ............... 348/15 |
| 6,121,998 | * | 9/2000 | Voois et al. ................. 348/14 |
| 6,141,404 | * | 10/2000 | Westerlage et al. ............. 379/118 |

FOREIGN PATENT DOCUMENTS

| | | | |
|---|---|---|---|
| 298 17 564 U 1 | | 2/1999 | (DE) . |
| 406351016A | * | 12/1994 | (JP) ................ H04N/7/15 |
| WO 96/02106 | | 1/1996 | (WO) .................... 5/232 |

OTHER PUBLICATIONS

WO 98/19458, Ojala et al., Video Conferencing Equipment, May 1998.*

* cited by examiner

Primary Examiner—Curtis Kuntz
Assistant Examiner—Melur Ramakrishnaiah
(74) Attorney, Agent, or Firm—Michael A. Glenn

(57) ABSTRACT

A portable video conference module supporting a network-based video conference comprising a processor, a video camera, and audio input device and several interfaces coupled to the processor. The processor includes a local instruction processor accessing a local non-volatile memory. The interfaces include a wireless data capture interface, a video display interface, an audio output interface and a network interface.

59 Claims, 22 Drawing Sheets

PORTABLE CONFERENCE CENTER

TECHNICAL FIELD

This invention relates to a portable conference center mechanism.

BACKGROUND ART

The most common form of distributed meeting today is the conference telephone call. Such mechanisms allow people to meet in several distant locations and interact in a real time fashion. There are however some severe limitations with such systems. Most importantly, there is no visual imagery. It is often difficult to keep track of voices and names without being able to see the faces. It is often difficult to understand what is being discussed without access to some visual cues, such as slide presentations and/or whiteboard activities.

Traditional video conferencing systems address some of these limitations. However, traditional video conferencing systems are large, expensive systems, often requiring a dedicated room. Such systems are usually quite complex, with thick instruction manuals, often further requiring trained personnel to maintain and setup for specific conferences.

There are inexpensive video cameras developed interface to a computer and with a microphone interfaced to that computer, can provide limited video conferencing capability. Such systems components have a number of limitations and problems associated with them. First, they are not a complete system solution to the video conferencing requirements. Significant software must be provided to integrate, synchronize and compress the audio and video generated locally with the rest the audio-video streams generated elsewhere. It is questionable whether an unaided computer can actually compress the audio-video stream quickly enough to keep it real time, with high enough visual resolution and audio noise suppression, to provide viable support at the available bandwidth. Often the cameras being used today lack the depth of field and resolution necessary to discern facial expressions of more than one person at a time. What is needed is an inexpensive, self-contained audio-visual support device complete with compression capabilities which can interface to existing computers to support portable audio-video conferencing.

Many business meetings require intensive use of whiteboards or some other writing device, such as flip chart or paper pads. Traditional video conferencing systems do not capture whiteboard contents well. The video conference system camera aimed at a whiteboard encounters a highly reflective surface. It is often difficult, if not impossible, to adjust the contrast and brightness to effectively capture the whiteboard contents within the time constraints of the meeting. While there are some less reflective whiteboards which are made for use with traditional video conferencing cameras, they are expensive and not considered a portable solution.

There are some whiteboard conference solutions able to accurately capture whiteboard activities. Some of these solutions are considered portable, employing technologies such as resistive touch screens. However, such systems are at the limits of what can be considered portable, with a 60 cm by 90 cm whiteboard weighing close to 10 kilograms, and with carrying case, often approaching 15 kilograms.

There is one known flexible, roll-able resistive touch screen whiteboard available. It rolls up into a carrying tube that also carries the collapsible stand that the screen is stretched over during use. It is expensive, with increasing cost as the display area becomes larger. The portability is further negatively impacted as the weight grows with the display area.

There are often situations where a projected window of a computer would be quite useful in a video conference. Such situations include meetings where substantial amounts of detail must be reviewed and possibly modified.

Engineering review meetings would often benefit from the ability to project schematics and other technical drawings onto a large display device and then be able to affect such drawings as one would with a standard pointing device, such as a mouse. Such meetings often need to take place in the video conference setting and are today quite cumbersome, lacking a straightforward, portable mechanism for local and distributed presentation and pointing.

Similarly, graphically oriented manipulation of presentations and other material in a marketing, sales, or publication setting is also inhibited by the lack of interactivity with remote participants being unable to manipulate these often large, computer based materials.

What is needed is a truly portable conference center, able to fit into a compartment of a typical portable computer carrying case and provide not only excellent white board capture and transference, but also provide the capturing and transference of both quality audio and video by the portable conference center users.

What is further needed is a truly portable conference center, able to interface with existing whiteboards and computers, requiring the minimum of user interaction to calibrate and setup for a conference session.

What is further needed is a truly portable conference center which provides a uniformity of service ranging from the small location meeting, to distributed meetings within a LAN, to distributed meetings within a WAN, to meetings distributed across them Internet.

What is further needed is a truly portable conference center, able to support a projected computer pointing device.

DISCLOSURE OF THE INVENTION

Various aspects of this invention address all the above problems, needs and limitations of the prior art.

One aspect of the invention includes a portable video conference module supporting a network-based video conference comprising a processor, a video camera, and audio input device and several interfaces coupled to the processor. The processor includes a local instruction processor accessing a local non-volatile memory. The interfaces include a wireless data capture interface, a video display interface, an audio output interface and a network interface. The portable video conference module weighs less than about 3 KG.

The light weight and flexible interfaces advantageously permit a wide variety of display, projection and audio output equipment to be supported. The built-in video camera and audio input device advantageously provide the two critical input devices optimized for the video conference application. Networks as used herein refer not only to LANs, WANs, and the Internet, but also include any communication scheme involving a network interface. Network interfaces include but are not limited to LAN interfaces and modems.

The local instruction processor executes program code segments residing in the local non-volatile memory. A segment initializes a local audio video data stream of the video conference. Another segment repeatedly receives from the network interface an external audio-video stream to create a received video stream presented to the video display interface and to create a received audio stream presented to the audio output interface. Another segment receives a local video stream from the video camera and a local audio stream from the audio input device and receives the wireless data capture state from the wireless data capture interface to create a local audio video data stream. A segment sends the local audio video data stream to the network interface.

Program code segments may be advantageously implemented as threads in a real-time operating system in a microprocessor or embedded processor acting as the local instruction processor. Program code segments may also be advantageously implemented as event driven concurrent objects.

These program code segments are distinct in activity, structure and requirements from the other program code segments. It is advantageous to minimize user initialization and setup of the local audio video data stream. Organizing a program code segment to create the local audio video data stream and another program code segment to send the local audio video data stream across the network interface is an advantageous partitioning in terms of both creating the local audio video data stream and the transmission of that stream elsewhere. A separate program code segment receiving the external audio-video stream and creating a received audio stream and a received video stream to be presented to the audio output interface and video display interface respectively is also advantageous.

The wireless data capture interface can be coupled to a portable wireless interface supporting accurate real-time capture of writing or erasing from any writing surface, including a whiteboard, easel or paper. The wireless data capture interface supporting capture of writing from existing whiteboards is very advantageous, as this is a major problem in general. It is also advantageous in providing a significant improvement to existing portable electronic whiteboards, which require the use of a separate whiteboard but also require many times the weight to be transported. Portable electronic whiteboards also fail to provide video cameras and optimal microphones supporting the other primary functions of such meetings, which are needed to share the sights and sounds of distant people spontaneously communicating.

A wireless data capture device can also be coupled with computer projection systems to provide a virtual pointing device in such video conference environments. This advantageously allows distant participants to interact with computation objects such as computer aided design databases as well as other databases and documents.

Another embodiment acts as an add-on module coupled to a computer via a module interface. The computer includes a display device and an audio output device. The module interface is used to send the received video stream to the computer display device and to send the received audio stream to the computer audio output device. This advantageously supports a low cost add-on to existing computers, making video conferencing a much more widely available capability. It advantageously makes possible the use of video conferencing by many more people and groups than today. It does not require a dedicated room, lots of space to store, or weigh much when transported.

A further embodiment supports use of an external network interface on the computer to perform the communication of the network interface through the module interface to the computer external network interface. This further advantageously reduces the cost of the portable video conference module whenever someone already owns a computer with an adequate network interface.

Another further embodiment includes a mechanical attachment able to mechanically attach the portable video conference center with module interface to the computer. This advantageously provides a convenient mounting platform for the portable video conference center on the computer.

Another embodiment includes a standard computer interface in the module interface to a computer. Further embodiments include that standard computer interface being a PCMCIA or USB interface. Note that PCMCIA and PCM are two compatible versions of the same standard computer interface.

Standard computer interfaces employed to provide the module interface are advantageous in providing a low cost, well tested mechanism for interfacing the portable video conference center to the computer.

Another embodiment further includes a compression accelerator coupled to the local instruction processor. A further embodiment occurs when the video camera coupled to the local instruction processor further includes the video camera coupled to the compression accelerator. These embodiments advantageously provide increased capability to improve the transmission bandwidth required for a video stream of a given quality level.

Another embodiment further includes video display ram coupled to the video display interface. Another embodiment further includes a decompression accelerator coupled to the local instruction processor. Further embodiments include the coupling of local instruction processor to the video display interface further includes coupling the decompression accelerator to the video display interface. A further embodiment includes the decompression accelerator coupled to video display ram. These embodiments advantageously provide increased capability to improve the reception bandwidth required for a video stream of a given quality.

Another embodiment of the invention further includes a video display coupled to the video display interface. This advantageously permits the video display to be optimized for the task of presenting the video conference. A further embodiment includes a selector device. A further embodiment includes the video display being a flat panel display. A further embodiment includes the selector device including a touch sensitive panel integrated with the video display. These embodiments further advantageously improve the user interface of the invention.

A further embodiment includes the module weighing less than about 2.5 KG. A further embodiment includes the module weighing less than about 2 KG. A further embodiment includes the module weighing less than about 1.5 KG. A further embodiment includes the module weighing less than about 1 KG. A further embodiment includes the module weighing less than about 0.5 KG. Each of these embodiments provides a significant advantage over its predecessor by reducing the total transported weight for a video conference.

Embodiments include the network interface supporting a wireline physical transport layer or a wireless physical transport layer. Another embodiment includes the network interface supporting ATM. ATM network support is a widely used and increasingly common communications technology providing a significant increase in delivered bandwidth to applications such as the portable conference center. Note that versions of ATM are found with both wireless and wireline physical transport layers.

Another embodiment includes the network interface supporting a multi-channel access protocol. Multi-channel access protocols advantageously provide greater optimization of delivered bandwidth in a variety of situations. A further embodiment includes the multi-channel access protocol supporting frequency modulation. Another further embodiment includes the multi-channel access protocol supporting time division. Another further embodiment includes the multi-channel access protocol supporting wavelet mechanisms. Another further embodiment includes the multi-channel access protocol supporting spread spectrum mechanisms. A further embodiment includes the multi-channel access protocol supporting broadband spread spectrum. Another further embodiment includes the multi-channel access protocol supporting DSL. These various multi-access protocols and protocol components provide central tools to optimize the delivery of bandwidth to distributed users of the portable video conference.

Another embodiment includes software using the network interface supporting the TCPIP protocol. Support of the TCPIP protocol opens the door to network access in many systems. A further embodiment includes software using the network interface supporting Internet access. Support of Internet access advantageously supports interacting with the vast majority of networks in the world. A further embodiment includes software supporting the World Wide Web. Support of the World Wide Web is also advantageous in providing a user friendly interface to network access which is well understood by most people likely to use a portable video conference. Another further embodiment includes software using the network interface supporting the Wireless Application Protocol. The Wireless Application Protocol advantageously supports the Internet and World Wide Web delivered in a wireless physical transport layer.

Another embodiment includes the audio output interface supporting a digital protocol. Digital audio protocols do not exhibit signal degradation over long lines. Another embodiment includes the audio output interface supporting an analog protocol. External audio output devices commonly support analog audio protocols. Another embodiment includes an audio output device coupled to the audio output interface. A built-in audio output device is advantageous in reducing the amount of external hardware which must be interfaced to make a video conference.

Another embodiment includes the wireless data capture interface supporting a wireline physical transport layer to couple to a wireless data capture device. Another embodiment includes the wireless data capture interface supporting a wireless physical transport layer to couple to a wireless data capture device. A further embodiment includes the wireless data capture interface wireless physical transport layer interacting in the infrared spectrum. Another further embodiment includes the wireless data capture interface wireless physical transport layer interacting in the radio spectrum. A further embodiment includes the wireless data capture interface wireless physical transport layer employing at least part of the Bluetooth communications protocol. These embodiments advantageously minimize the wiring which users must contend with in setting up a video conference.

These and other advantages of the present invention will become apparent upon reading the following detailed descriptions and studying the various figures of the drawings.

DETAILED DESCRIPTION OF THE INVENTION

Figure 1:
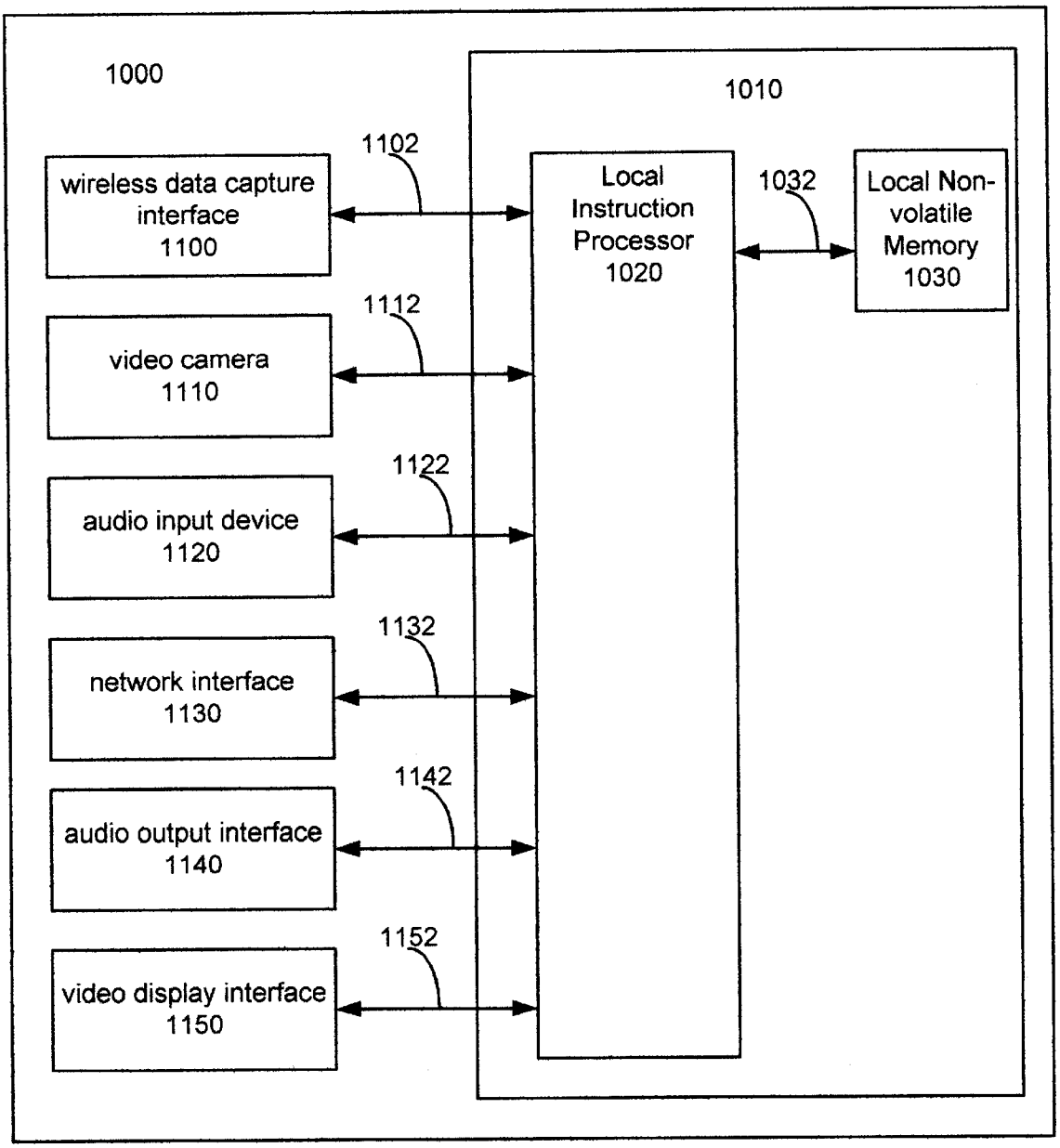
FIG. 1 depicts a system block diagram of an embodiment 1000 in accordance with an aspect of the invention.

FIG. 1 depicts a system block diagram of an embodiment 1000 of a portable conference center in accordance with an aspect of the invention. Portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

Processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

In certain embodiments, processor 1010 is packaged as a module. In certain further embodiments, processor 1010 is packaged on a printed circuit board. In certain further embodiments, processor 1010 is packaged as a PCMCIA card. In certain other further embodiments, processor 1010 is packaged as an integrated circuit.

In certain embodiments, local instruction processor 1020 includes but is not limited to a microprocessor. In certain embodiments, local instruction processor 1020 includes but is not limited to an embedded processor. In certain embodiments, local instruction processor 1020 includes but is not limited to a programmable finite state machine. Programmable finite state machines include but are not limited to field programmable logic devices, field programmable gate arrays and table driven finite state machines. In certain embodiments, local instruction processor 1020 includes but is not limited to bit slice engines. In certain embodiments, local instruction processor 1020 includes but is not limited to byte code engines. In certain embodiments, local instruction processor 1020 includes but is not limited to application specific components. Application specific components as used herein include but are not limited to digital processor cores, signal processors, image processors, image compression accelerators and image decompression accelerators.

Image circuitry as used herein refers to either or both still image circuitry and motion image circuitry. Image circuitry implements imaging algorithms. Imaging algorithms include but are not limited to Fourier based algorithms, wavelet based algorithms and fractal based algorithms. Fourier based algorithms include but are not limited to components of JPEG, MPEG1, MPEG2 and MPEG4. Wavelet algorithms include but are not limited to components of MPEG4. Fractal based algorithms include but are not limited to algorithms based on iterated function systems.

In certain embodiments, local instruction processor 1020 includes but is not limited to local ram. In certain further embodiments, local instruction processor 1020 includes but is not limited to a local cache ram. In certain embodiments, local instruction processor 1020 includes but is not limited to ram specifically for data access. In certain embodiments, local instruction processor 1020 includes but is not limited to ram specifically for instruction access. In certain embodiments, local instruction processor 1020 includes but is not limited to specific, distinct ram configurations for data access and instruction access.

As used herein various embodiments of processor 1010 include but are not limited to SISD architectures, SIMD architectures, MISD architectures, MIMD architectures and combinations of these architectures.

In certain embodiments, local nonvolatile memory 1030 includes but is not limited to arrays of one or more semiconductor memory devices. In certain embodiments, local nonvolatile memory 1030 includes but is not limited to nonvolatile memory configured as a file management system.

In certain embodiments, local nonvolatile memory 1030 includes but is not limited to a detachable component of processor 1010. In certain further embodiments, local nonvolatile memory 1030 includes but is not limited to a removable package. In certain further embodiments, local nonvolatile memory 1030 includes but is not limited to a PCMCIA card. In certain further embodiments, local nonvolatile memory 1030 includes but is not limited to a Compact Flash™ card.

In certain embodiments, wireless data capture interface 1100 supports a wireline physical transport layer. In certain further embodiments, wireless data capture interface 1100 the supported wireline physical transport layer includes a fiber optic component. In further embodiments, wireless data capture interface 1100 the supported wireline physical transport layer includes a twisted pair component. In further embodiments, wireless data capture interface 1100 the supported wireline physical transport layer includes a standardized bus component.

In certain embodiments, wireless data capture interface 1100 supports a wireless physical transport layer. In certain further embodiments, wireless data capture interface 1100 the supported wireless physical transport layer interacts in the infra-red spectrum. In other further embodiments, wireless data capture interface 1100 the supported wireless physical transport layer interacts in the radio spectrum. In certain further embodiments, wireless data capture interface 1100 the supported wireless physical transport layer interacts in the radio spectrum supporting at least part of the Bluetooth standard.

In certain embodiments, video camera 1110 includes a CCD array. In certain embodiments, video camera 1110 includes an adjustable lens or lens assembly.

In certain further embodiments, the lens assembly may be controlled via video camera coupling 1112 by local instruction processor 1020.

In certain embodiments, audio input device 1120 includes a single microphone. In certain embodiments, audio input device 1120 includes multiple microphones. In certain embodiments, audio input device 1120 includes an amplifier coupled to each microphone. In certain embodiments, audio input device 1120 includes an A/D circuit input channel coupled to each microphone. In certain embodiments, audio input device 1120 includes each microphone coupled to an amplifier, which couples to an A/D circuit input channel.

In certain embodiments, network interface 1130 supports a wireline physical transport layer. In certain further embodiments, network interface 1130 the supported wireline physical transport layer includes a fiber optic component. In further embodiments, network interface 1130 the supported wireline physical transport layer includes a twisted pair component. In other further embodiments, network interface 1130 the supported wireline physical transport layer includes a coaxial cable component.

In certain embodiments, network interface 1130 supports a wireless physical transport layer. In certain further embodiments, network interface 1130 the supported wireless physical transport layer interacts in the infra-red spectrum. In other further embodiments, network interface 1130 the supported wireless physical transport layer interacts in the radio spectrum. In further embodiments, network interface 1130 the supported wireless physical transport layer interacts in the microwave spectrum.

In certain embodiments, network interface 1130 support includes but is not limited to frequency modulation. In certain embodiments, network interface 1130 support includes but is not limited to time domain multiplexing. In certain embodiments, network interface 1130 support includes but is not limited to FDMA. In certain embodiments, network interface 1130 support includes but is not limited to TDMA. In certain embodiments, network interface 1130 support includes but is not limited to wavelet mechanisms. In certain embodiments, network interface 1130 support includes but is not limited to DSL mechanisms. In certain further embodiments, network interface 1130 support includes but is not limited to ADSL mechanisms. In certain embodiments, network interface 1130 support includes but is not limited to ATM compatible mechanisms.

In certain embodiments, network interface 1130 support includes but is not limited to spread spectrum mechanisms. In certain further embodiments, network interface 1130 support includes but is not limited to frequency hopping. In certain further embodiments, network interface 1130 support includes but is not limited to time hopping. In certain further embodiments, network interface 1130 support includes but is not limited to direct sequence or CDMA. In certain further embodiments, network interface 1130 support includes but is not limited to broadband spread spectrum. In further embodiments, network interface 1130 support includes but is not limited to wide band-CDMA.

In certain embodiments, one or more of couplings 1102, 1112,1122,1132, 1142 and 1152 may be implemented as computer buses or transactions upon one or more computer busses. In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

In certain embodiments, program code segments executed by the local instruction processor 1020 and residing in local nonvolatile memory 1030 include but are not limited to program code segments supporting the TCPIP protocol via the network interface 1130. In certain further embodiments, program code segments executed by the local instruction processor 1020 and residing in local nonvolatile memory 1030 include but are not limited to program code segments supporting the Wireless Application Protocol via the network interface 1130. In certain further embodiments, program code segments executed by the local instruction processor 1020 and residing in local nonvolatile memory 1030 include but are not limited to program code segments supporting Internet access via the network interface 1130. In certain further embodiments, program code segments executed by the local instruction processor 1020 and residing in local nonvolatile memory 1030 include but are not limited to program code segments supporting accessing the World Wide Web via the network interface 1130.

In certain embodiments, audio output interface 1140 supports an analog output protocol. In certain further embodiments, audio output interface 1140 includes an output amplifier. In other further embodiments, audio output interface 1140 supports multiple analog audio outputs. In other further embodiments, audio output interface 1140 supports a single analog output.

In certain embodiments, audio output interface 1140 supports a digital output protocol. In certain further embodiments, audio output interface 1140 supports at least part of the MP3 protocol. In certain further embodiments, audio output interface 1140 supports at least part of the AC3 protocol.

In certain embodiments, video display interface support 1150 includes but is not limited to an analog protocol. In certain further embodiments, video display interface 1150 support includes but is not limited to NTSC. In other further embodiments, video display interface 1150 support includes but is not limited to PAL.

In certain embodiments, video display interface 1150 support includes but is not limited to HDTV. In certain embodiments, video display interface 1150 support includes but is not limited to flat panel display protocols. In certain embodiments, video display interface 1150 support includes but is not limited to digital protocols. In certain embodiments, video display interface 1150 support includes but is not limited to RGB.

Figure 2:
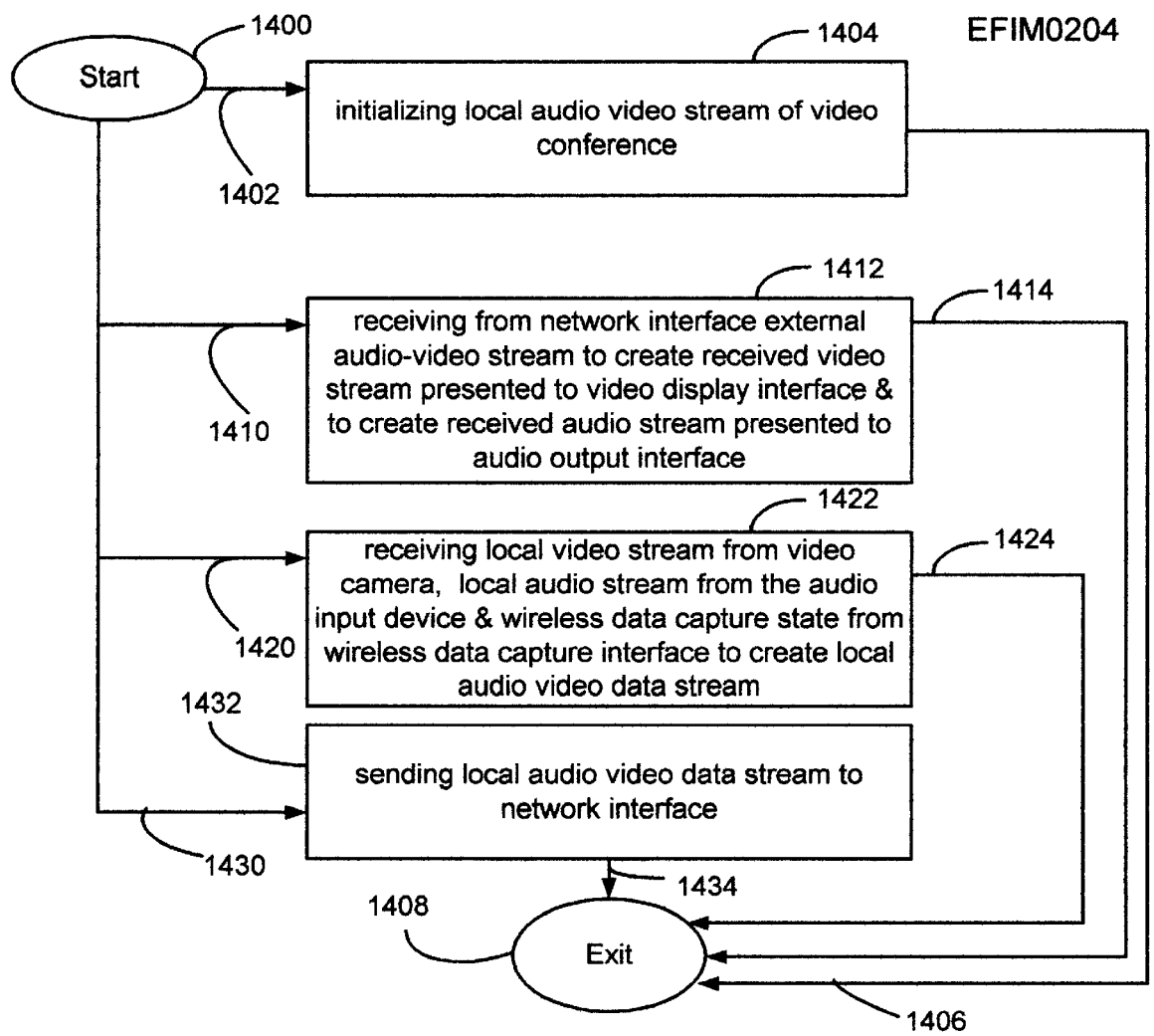
FIG. 2 depicts a flowchart of program code segments executed by the local instruction processor 1020 residing in local non-volatile memory 1030 in accordance with an aspect of the invention.

FIG. 2 depicts a flowchart of program code segments executed by the local instruction processor 1020 residing in local non-volatile memory 1030 in accordance with an aspect of the invention.

Operation 1400 starts the operations of this flowchart. Arrow 1402 directs the flow of execution from operation 1400 to operation 1404. Operation 1404 performs initializing a local audio video data stream of the video conference. Arrow 1406 directs execution from operation 1404 to operation 1408. Operation 1408 terminates the operations of this flowchart.

Arrow 1410 directs the flow of execution from starting operation 1400 to operation 1412. Operation 1412 performs receiving from the network interface 1130 an external audio-video stream to create a received video stream presented to the video display interface 1150 and to create a received audio stream presented to the audio output interface 1140. Arrow 1414 directs execution from operation 1412 to operation 1408. Operation 1408 terminates the operations of this flowchart.

Arrow 1420 directs the flow of execution from starting operation 1400 to operation 1422. Operation 1422 performs receiving a local video stream from video camera 1110, receiving a local audio stream from the audio input device 1120 and receiving a wireless data capture state from wireless data capture interface 1100 to create the local audio video data stream. Arrow 1424 directs execution from operation 1422 to operation 1408. Operation 1408 terminates the operations of this flowchart.

Arrow 1430 directs the flow of execution from starting operation 1400 to operation 1432. Operation 1432 performs sending the local audio video data stream to network interface 1130. Arrow 1434 directs execution from operation 1432 to operation 1408. Operation 1408 terminates the operations of this flowchart.

Figure 3:
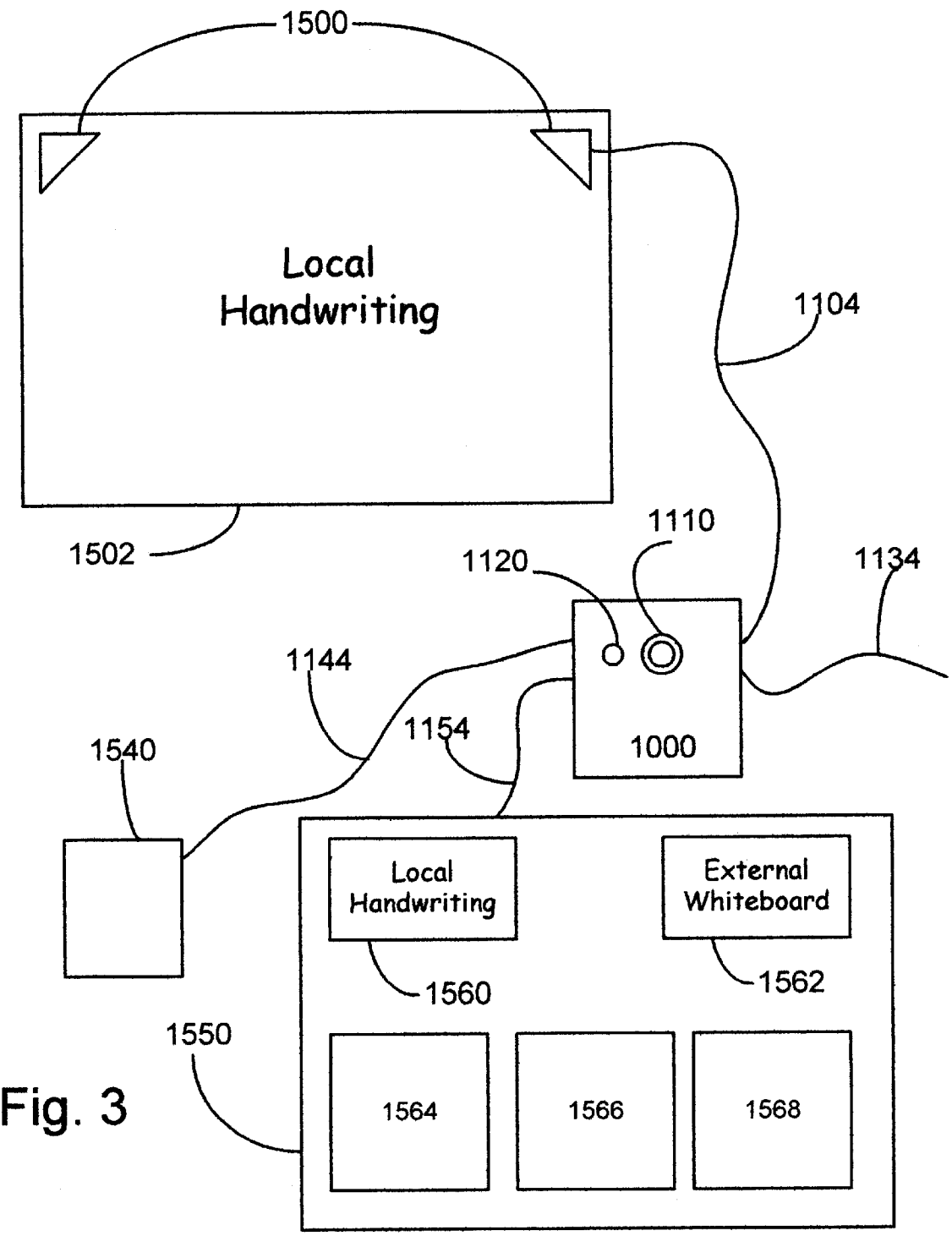
FIG. 3 depicts an application of embodiment 1000 employing a wireless data capture device 1500, audio output device 1540 and video display 1550.

FIG. 3 depicts an application of portable conference center embodiment 1000 employing a wireless data capture device 1500, audio output device 1540 and video display 1550.

Portable conference center 1000 wireless data capture interface 1100 of FIG. 1 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In certain further embodiments, the network coupling 1134 radio spectrum physical transport layer interacts in the microwave spectrum.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

Portable conference center 1000 audio output interface 1140 of FIG. 1 is coupled 1144 to an external audio output device 1540. In certain embodiments, audio output coupling 1144 supports an analog output protocol. In certain further embodiments, audio output interface 1140 includes an output amplifier. In other further embodiments, audio output coupling 1144 supports multiple analog audio outputs. In other further embodiments, audio output coupling 1144 supports a single analog output.

In certain embodiments, audio output coupling 1144 supports a digital output protocol. In certain further embodiments, audio output coupling 1144 supports at least part of the MP3 protocol. In certain further embodiments, audio output coupling 1144 supports at least part of the AC3 protocol.

Portable conference center 1000 video display interface 1150 is coupled 1154 to video display 1550. In certain embodiments, video display coupling support 1154 includes but is not limited to an analog protocol. In certain further embodiments, video display coupling 1154 support includes but is not limited to NTSC. In other further embodiments, video display coupling 1154 support includes but is not limited to PAL.

In certain embodiments, video display coupling 1154 support includes but is not limited to HDTV. In certain embodiments, video display coupling 1154 support includes but is not limited to flat panel display protocols. In certain embodiments, video display coupling 1154 support includes but is not limited to digital protocols. In certain embodiments, video display coupling 1154 support includes but is not limited to RGB.

Figure 4:
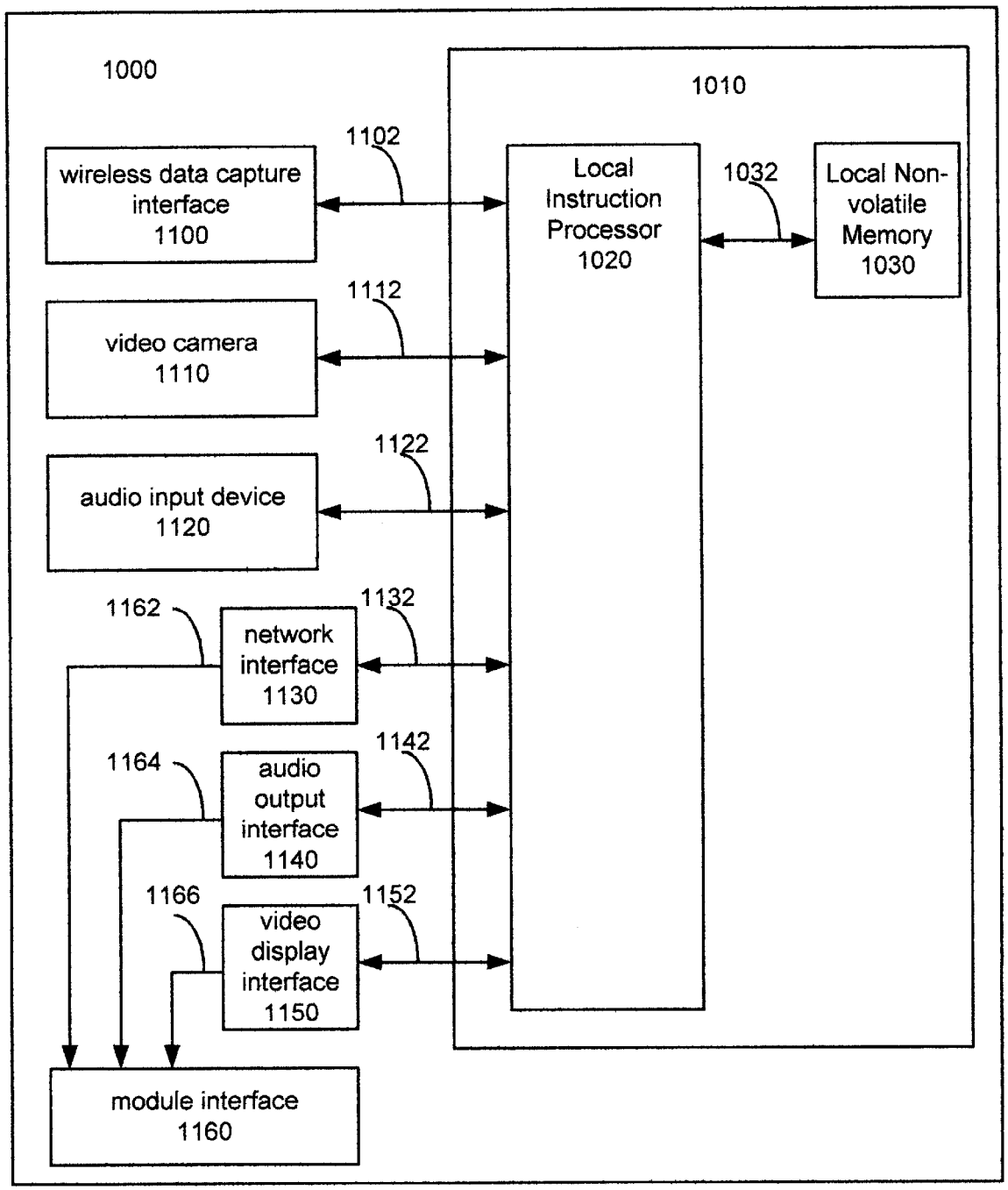
FIG. 4 depicts a system block diagram of a further embodiment 1000 of FIG. 1 incorporating a module interface to a computer in accordance with an aspect of the invention.

FIG. 4 depicts a system block diagram of a further embodiment 1000 of FIG. 1 incorporating a module interface to a computer in accordance with an aspect of the invention.

As in FIG. 1, portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

As in FIG. 1, processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

In distinction with FIG. 1, portable conference center 1000 includes a module interface 1160, coupled to at least one of the following interfaces. Network interface 1130 couples 1162 to module interface 1160. Audio output interface 1140 couples 1164 to module interface 1160. Video display interface 1150 coupled 1166 to module interface 1160. For the sake of simplicity the following discussion will assume all three interfaces are coupled but all combinations of couplings of these three interfaces are considered within the intended scope of the invention.

In certain embodiments, module interface 1160 supports a computer bus. In certain further embodiments, module interface 1160 supports a live insertion and removal computer bus. In certain further embodiments, module interface supports at least part of the PCMCIA standard.

In certain embodiments, network interface 1130 couples 1162 as an addressable entity on the module interface 1160. In certain embodiments, audio output interface 1140 couples 1164 as an addressable entity on the module interface 1160. In certain embodiments, video display interface 1150 couples 1166 as an addressable entity on the module interface 1160.

In certain embodiments, module interface 1160 supports a wireline physical transport layer. In certain further embodiments, module interface 1160 physical transport layer support includes fiber optic cable. In further embodiments, module interface 1160 physical transport layer support includes fiber channel. In other further embodiments, module interface 1160 physical transport layer support includes coaxial cable. In other further embodiments, module interface 1160 physical transport layer support includes multi-wire cabling. In other further embodiments, module interface 1160 physical transport layer support includes ATM protocols.

Figure 5:
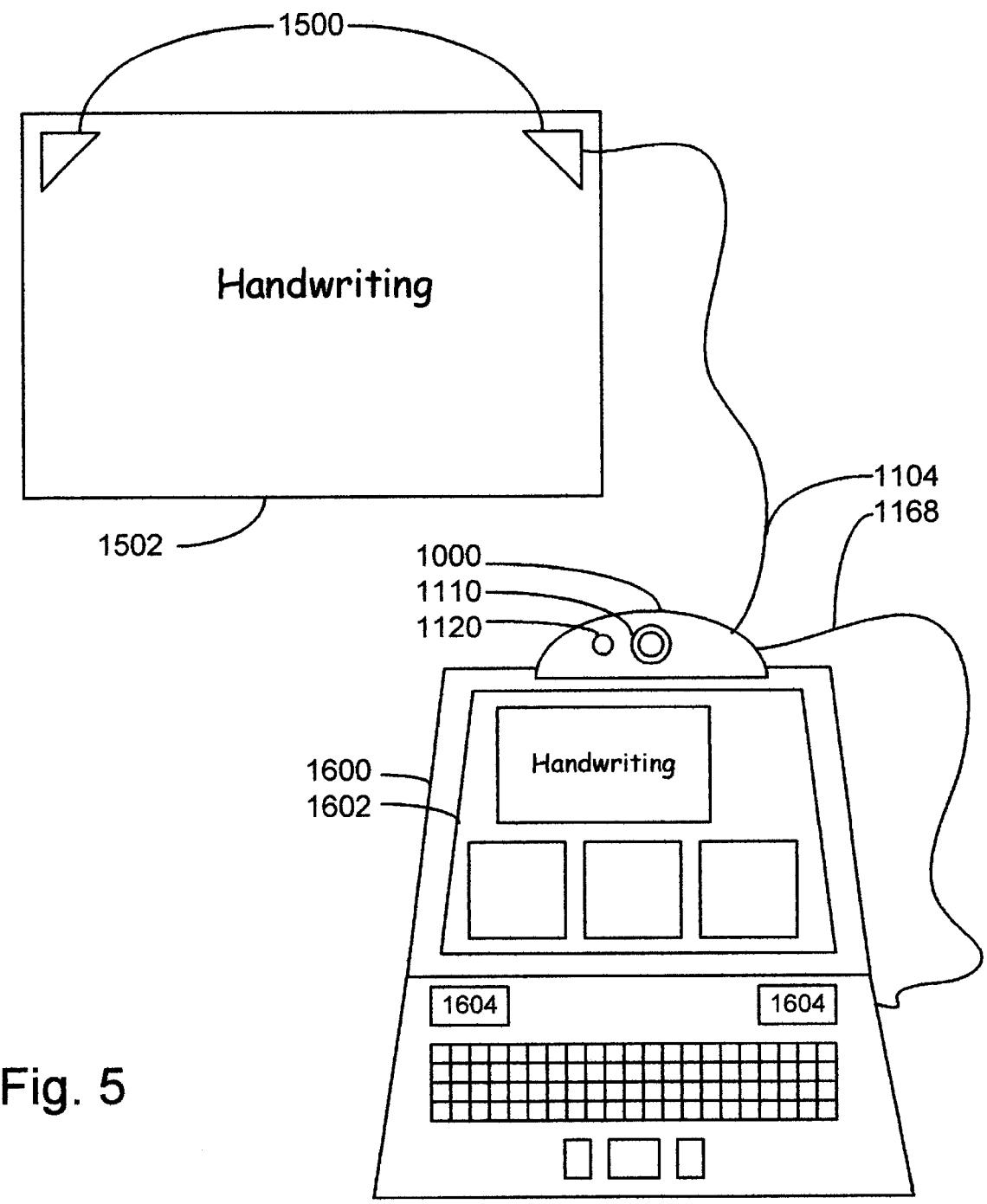
FIG. 5 depicts an application of further embodiment 1000 of FIG. 4 employing a wireless data capture device 1500 and computer 1600.

FIG. 5 depicts an application of further embodiment 1000 of FIG. 4 employing a wireless data capture device 1500 and computer 1600.

Portable conference center 1000 wireless data capture interface 1100 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

Portable conference center 1000 module interface 1160 of FIG. 4 couples 1168 to computer 1600. Computer 1600 includes a computer display device 1602, computer audio output devices 1604. Portable conference center 1000 video display interface 1150 traverses module coupling 1168 to drive at least part of the computer display 1602. Portable conference center 1000 audio output interface 1150 traverses module coupling 1168 to drive at least part of the audio output devices 1604.

Figure 6:
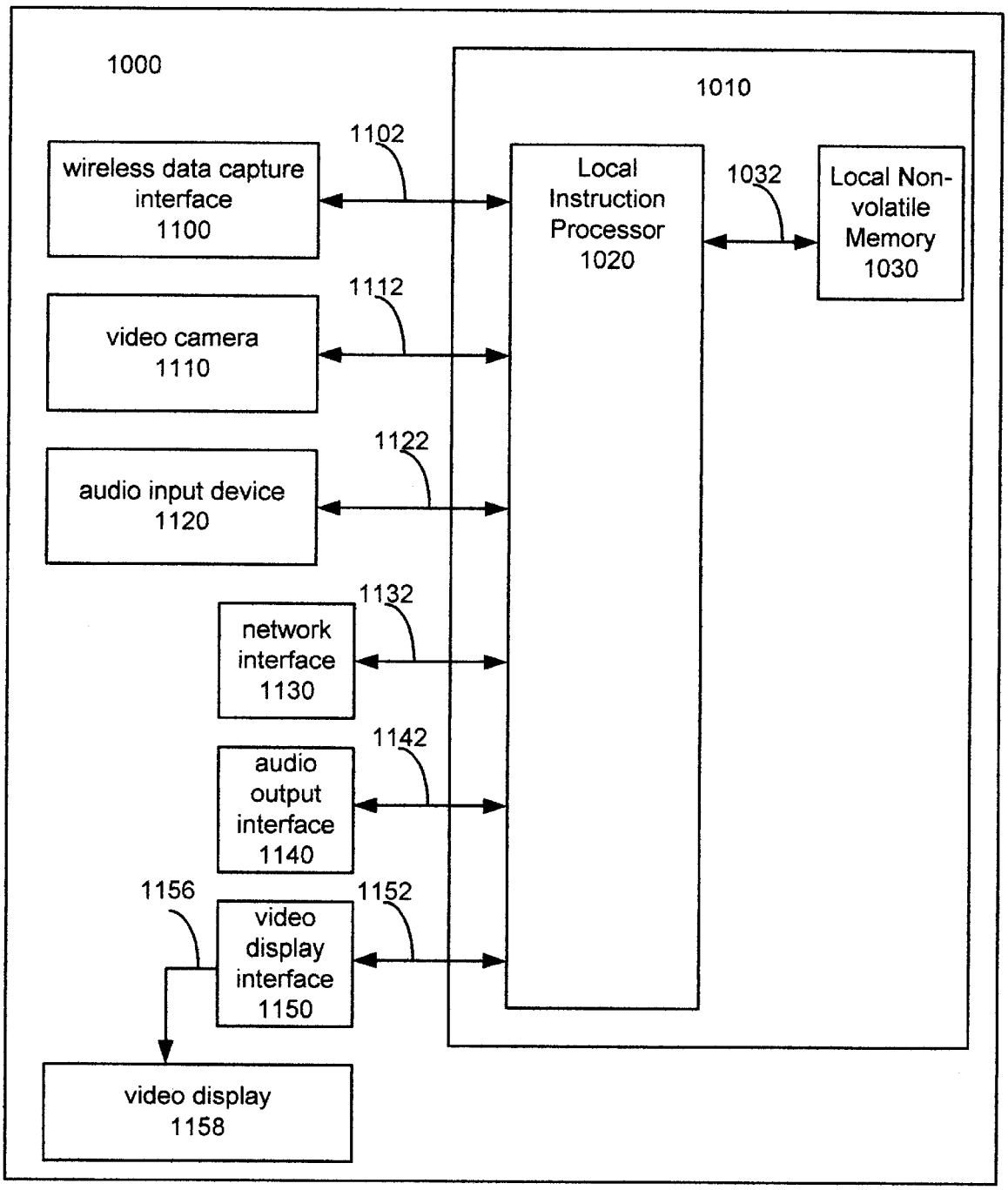
FIG. 6 depicts a system block diagram of a further embodiment 1000 of FIG. 1 incorporating an internal video display 1158 in accordance with an aspect of the invention.

FIG. 6 depicts a system block diagram of a further embodiment 1000 of FIG. 1 incorporating an internal video display 1158 in accordance with an aspect of the invention.

As in FIG. 1, portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

As in FIG. 1, processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

In distinction with FIG. 1, portable conference center 1000 includes video display 1158 coupled 1156 to video display interface 1150. In certain embodiments, video display 1158 includes a flat panel display.

Figure 7:
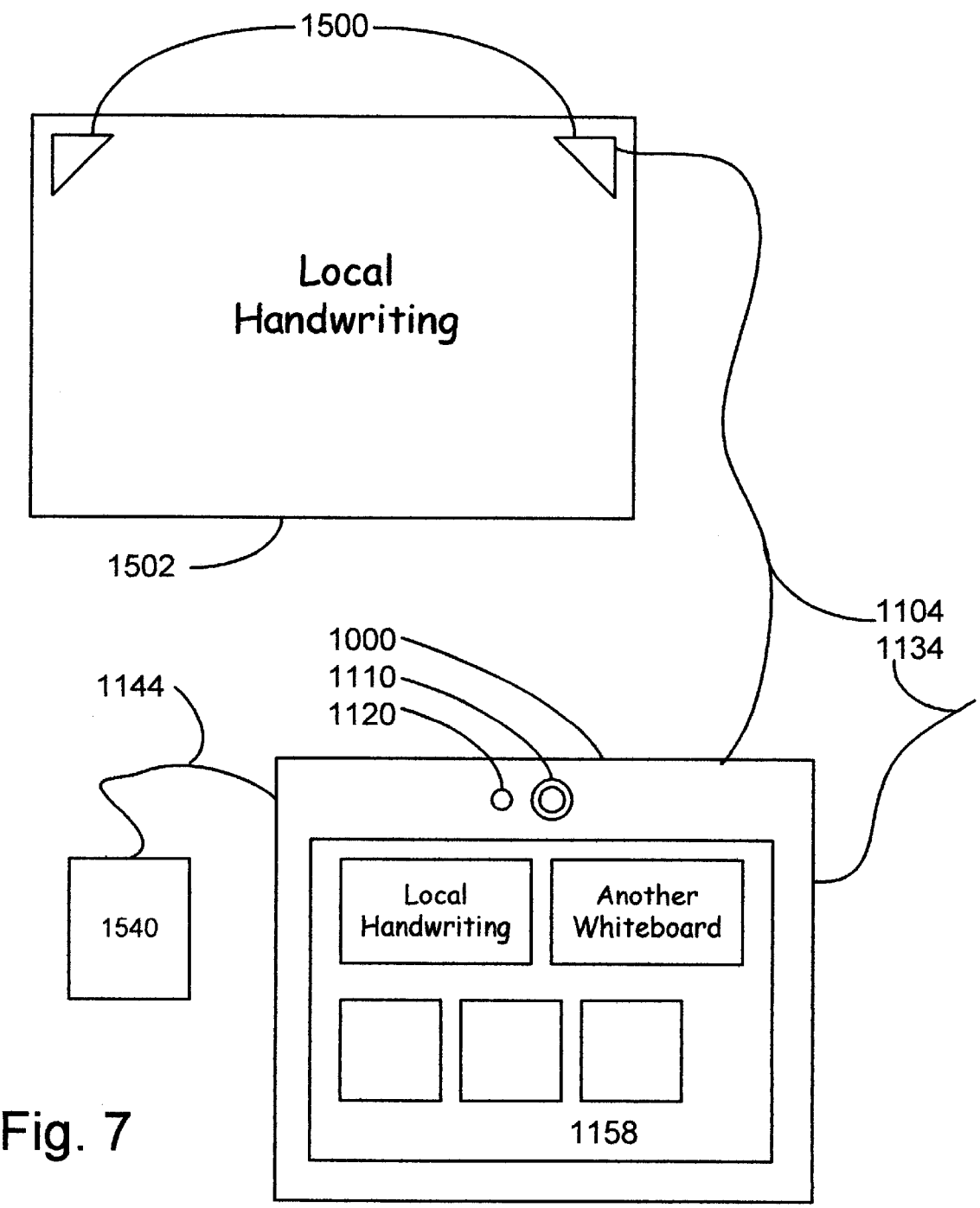
FIG. 7 depicts an application of further embodiment 1000 of FIG. 6 employing a wireless data capture device 1500 and audio output device 1540.

FIG. 7 depicts an application of further embodiment 1000 of FIG. 6 employing a wireless data capture device 1500 and audio output device 1540.

Portable conference center 1000 wireless data capture interface 1100 of FIG. 1 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In further embodiments, the network coupling 1134 radio spectrum physical transport layer interacts in the microwave spectrum.

Portable conference center 1000 audio output interface 1140 of FIG. 1 is coupled 1144 to an external audio output device 1540. In certain embodiments, audio output coupling 1144 supports an analog output protocol. In certain further embodiments, audio output coupling 1144 includes an output amplifier. In other further embodiments, audio output coupling 1144 supports multiple analog audio outputs. In other further embodiments, audio output coupling 1144 supports a single analog output.

In certain embodiments, audio output coupling 1144 supports a digital output protocol. In certain further embodiments, audio output coupling 1144 supports at least part of the MP3 protocol. In certain further embodiments, audio output coupling 1144 supports at least part of the AC3 protocol.

In certain embodiments, video display device 1158 is a flat panel display device.

Figure 8:
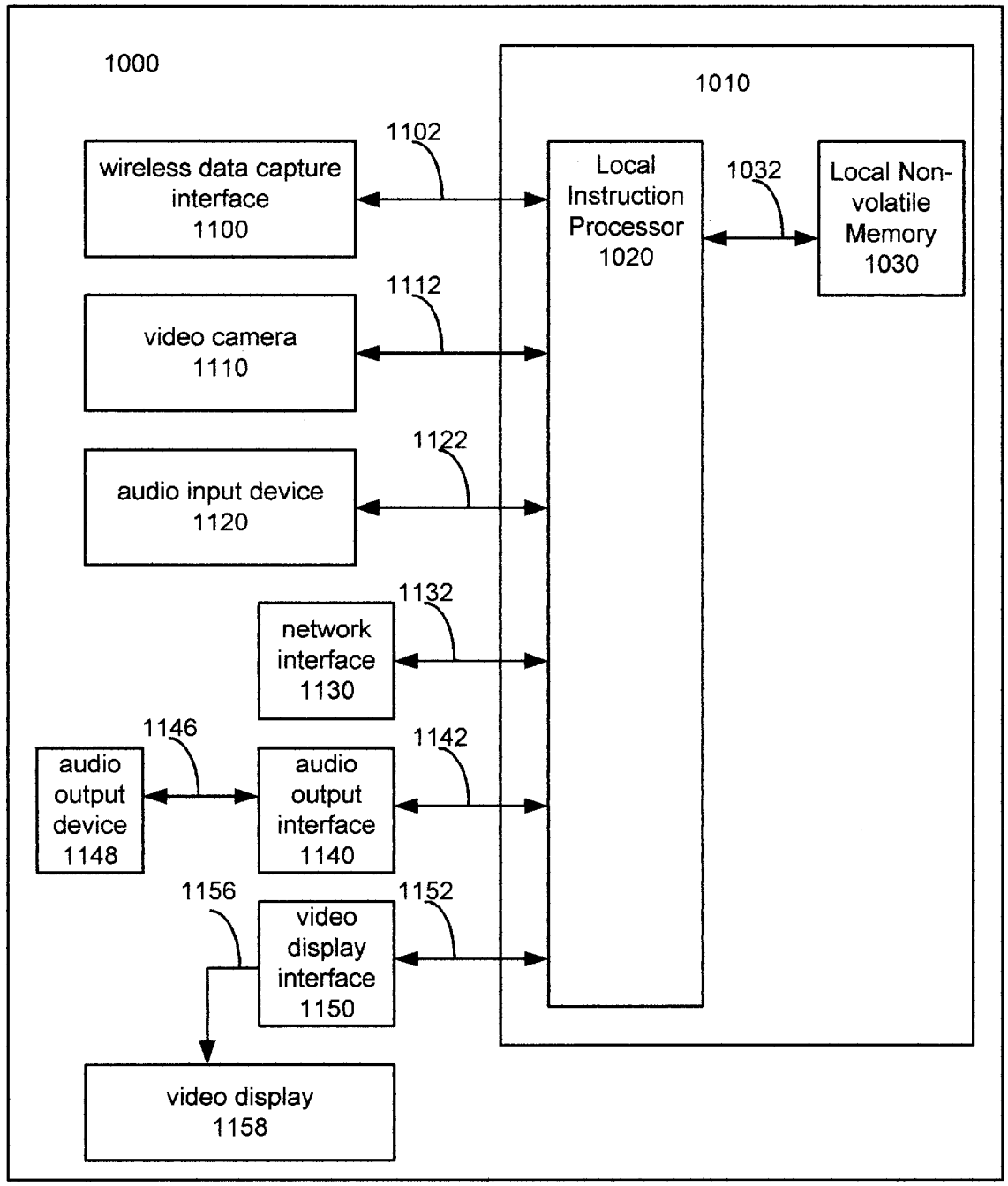
FIG. 8 depicts a system block diagram of a further embodiment 1000 of FIG. 6 incorporating an internal audio output device 1148 in accordance with an aspect of the invention.

FIG. 8 depicts a system block diagram of a further embodiment 1000 of FIG. 6 incorporating an internal audio output device 1148 in accordance with an aspect of the invention.

As in FIG. 1, portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

As in FIG. 1, processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

As in FIG. 6, portable conference center 1000 includes video display 1158 coupled 1156 to video display interface 1150. In certain embodiments, video display 1158 includes a flat panel display.

In distinction with FIG. 1 and 6, portable conference center 1000 includes audio output device 1148 coupled 1146 to audio output interface 1150. In certain embodiments, audio output device 1148 includes a single audio speaker. In certain embodiments, audio output device 1148 includes multiple audio speakers. In certain embodiments, audio output device 1148 includes a flat, transparent audio speaker mounted over the video display device 1158.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

Figure 9:
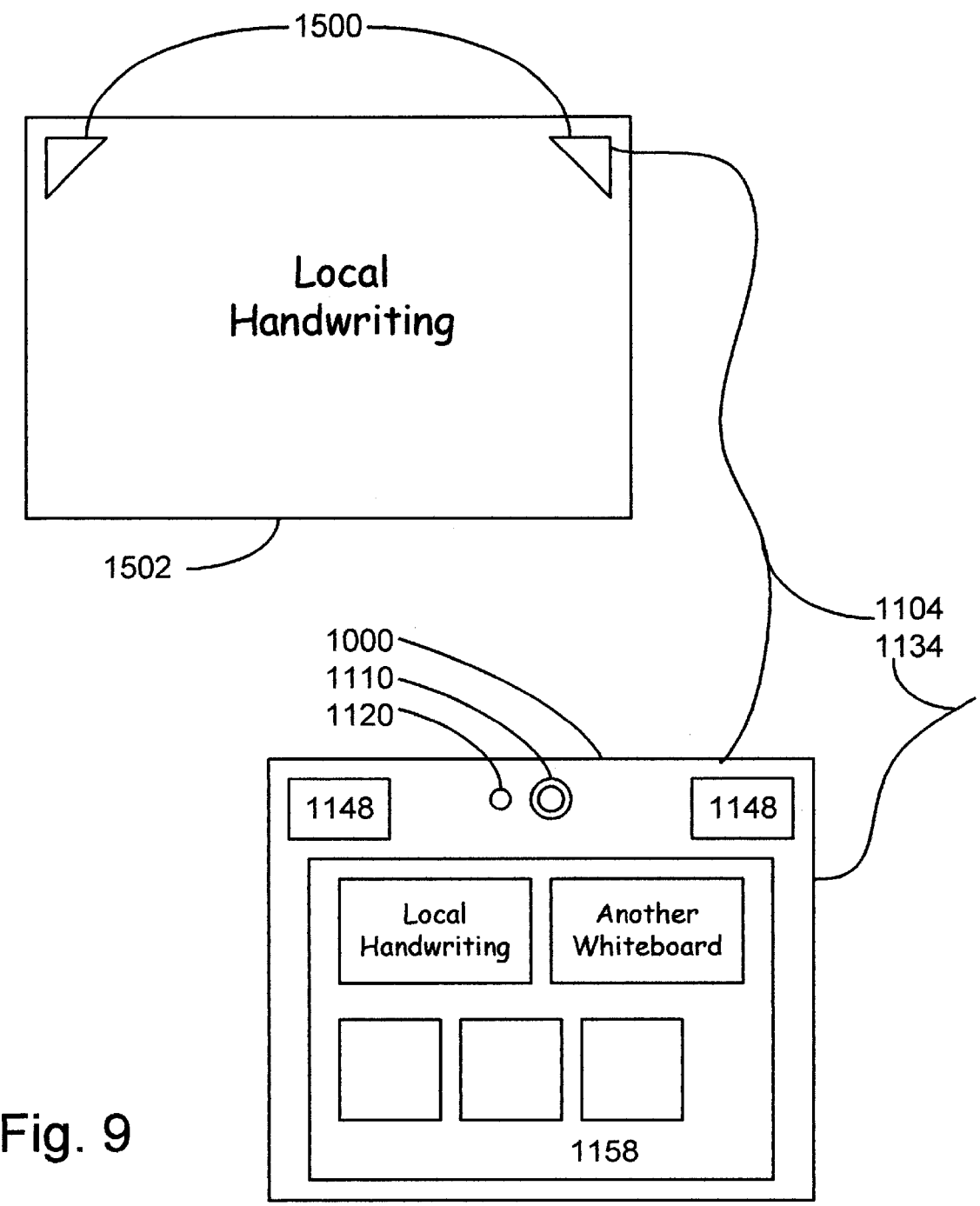
FIG. 9 depicts an application of further embodiment 1000 of FIG. 8 employing a wireless data capture device 1500.

FIG. 9 depicts an application of further embodiment 1000 of FIG. 8 employing a wireless data capture device 1500.

Portable conference center 1000 wireless data capture interface 1100 of FIG. 1 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In further embodiments, the network coupling 1134 radio spectrum physical transport layer interacts in the microwave spectrum.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

Figure 10:
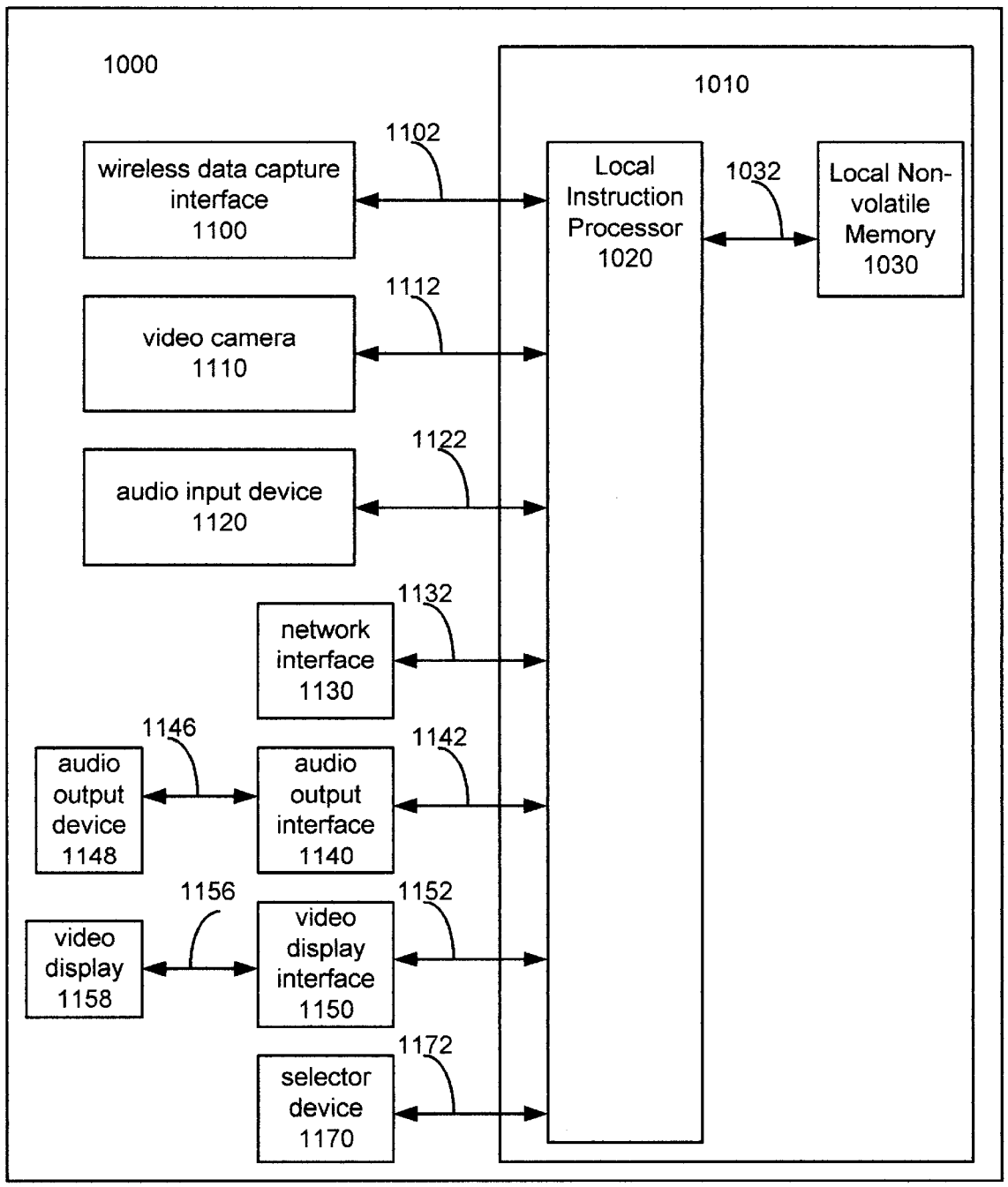
FIG. 10 depicts a system block diagram of a further embodiment 1000 of FIG. 8 incorporating a selector device in accordance with an aspect of the invention.

FIG. 10 depicts a system block diagram of a further embodiment 1000 of FIG. 8 incorporating a selector device in accordance with an aspect of the invention.

As in FIG. 1, portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

As in FIG. 1, processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

As in FIG. 6, portable conference center 1000 includes video display 1158 coupled 1156 to video display interface 1150. In certain embodiments, video display 1158 includes a flat panel display.

As in FIG. 8, portable conference center 1000 includes audio output device 1148 coupled 1146 to audio output interface 1150. In certain embodiments, audio output device 1148 includes a single audio speaker. In certain embodiments, audio output device 1148 includes multiple audio speakers. In certain embodiments, audio output device 1148 includes a flat, transparent audio speaker mounted over the video display device 1158.

In distinction with FIGS. 1, 6 and 8, portable conference center 1000 includes a selector device 1170 coupled 1172 to processor 1010 and further coupled 1172 to local instruction processor 1020.

In certain embodiments, the selector device 1170 and video display 1158 may be proximate. In certain further embodiments, selector device 1170 may include a touch pad. In other further embodiments, selector device 1170 may include a push stick. In other further embodiments, selector device 1170 may include a wireless mouse. In other further embodiments, selector device 1170 may include a television channel selector. In certain embodiments, selector device 1170 may be located proximate to video display 1158. Certain further embodiments may locate selector device 1170 above, below, to the right or left of video display 1158. In certain further embodiments, selector device 1170 may include a transparent, touch sensitive panel integrated as a layer on top of video display 1158.

Figure 11:
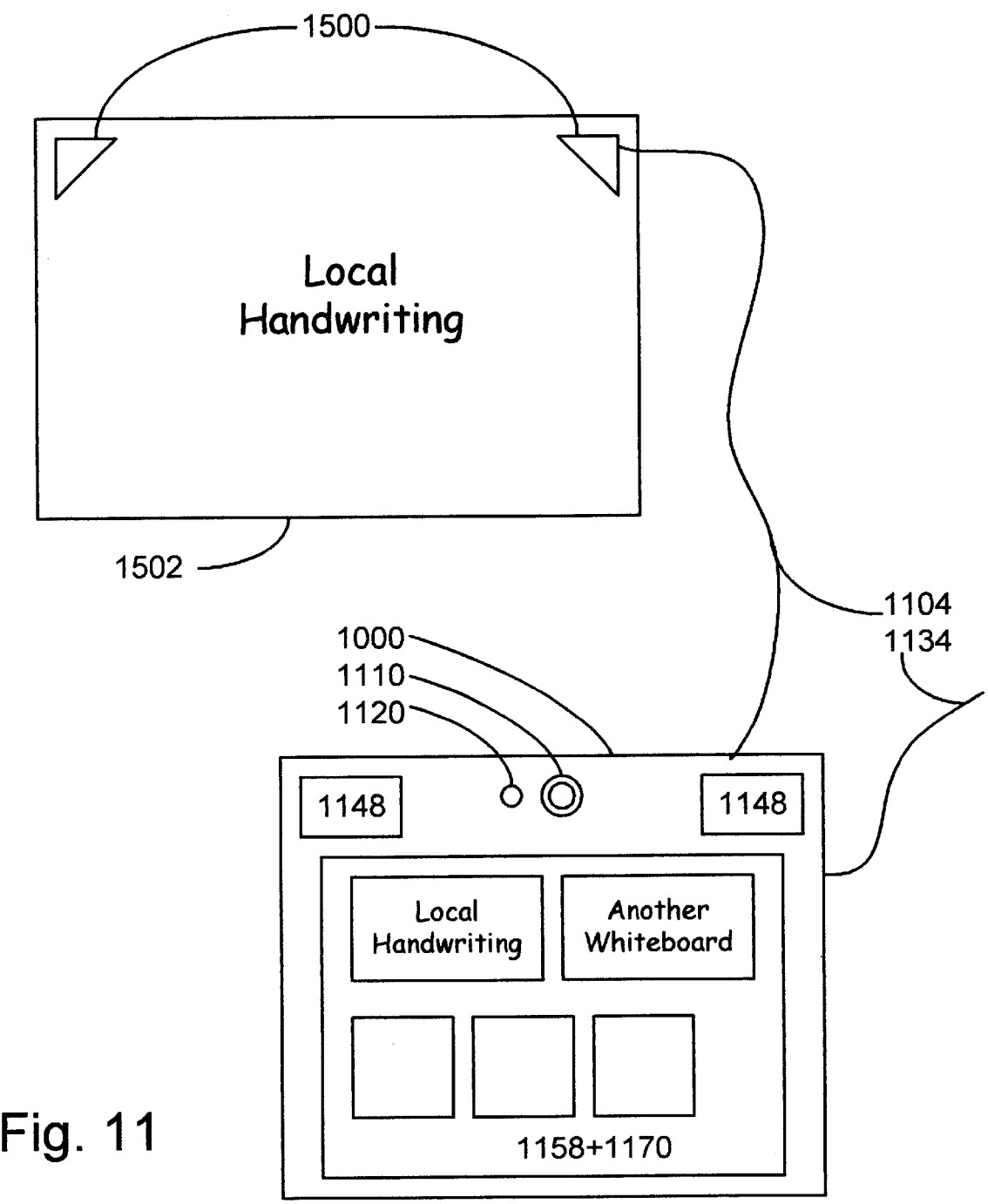
FIG. 11 depicts an application of further embodiment 1000 of FIG. 10 using an integrated video display and selector device employing a wireless data capture device 1500.

FIG. 11 depicts an application of further embodiment 1000 of FIG. 10 using an integrated video display and selector device employing a wireless data capture device 1500.

Portable conference center 1000 wireless data capture interface 1100 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In further embodiments, the network coupling 1134 radio spectrum physical transport layer interacts in the microwave spectrum.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

In certain embodiments, the selector device 1170 and video display 1158 may be proximate. In certain further embodiments, selector device 1170 may include a transparent, touch sensitive panel integrated as a layer on top of video display 1158.

Figure 12:
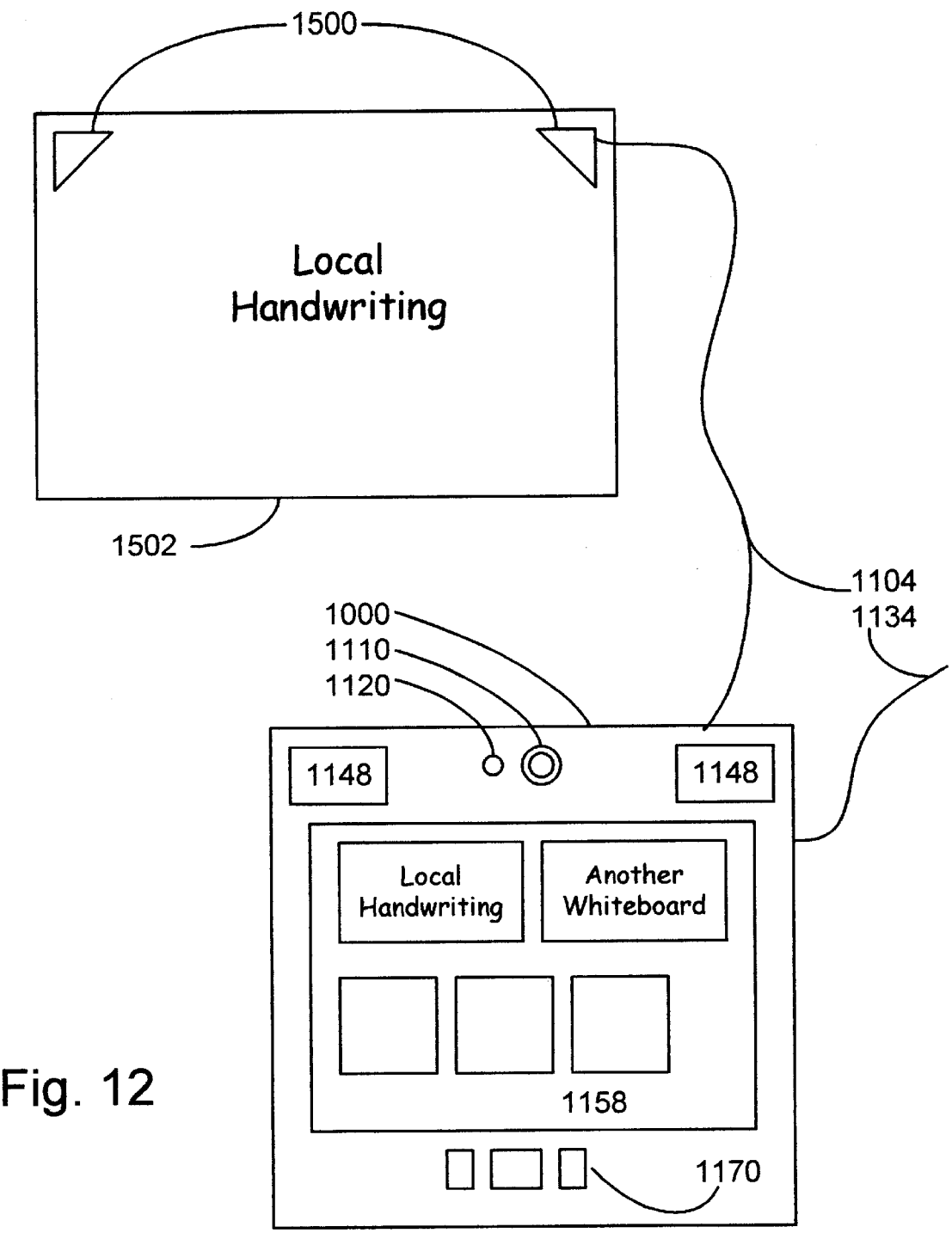
FIG. 12 depicts an application of further embodiment 1000 of FIG. 10 using a touch pad selector device employing a wireless data capture device 1500.

FIG. 12 depicts an application of further embodiment 1000 of FIG. 10 using a touch pad selector device employing a wireless data capture device 1500.

Portable conference center 1000 wireless data capture interface 1100 of FIG. 1 is coupled 1104 to wireless data capture device 1500. Wireless data capture device 1500 is situated proximate to a white board 1502 in certain embodiments.

Wireless data capture device 1500 is situated proximate to a back projection system 1502 in certain embodiments. Wireless data capture device 1500 is situated proximate to a flat panel display 1502 in certain embodiments.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In further embodiments, the network coupling 1134 radio spectrum physical transport layer interacts in the microwave spectrum.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

In certain embodiments, the selector device 1170 and video display 1158 may be proximate. In certain further embodiments, selector device 1170 may include a touch pad. In other further embodiments, selector device 1170 may include a push stick. In other further embodiments, selector device 1170 may include a wireless mouse. In other further embodiments, selector device 1170 may include a television channel selector. In certain embodiments, selector device 1170 may be located proximate to video display 1158. Certain further embodiments may locate selector device 1170 above, below, to the right or left of video display 1158.

Figure 13:
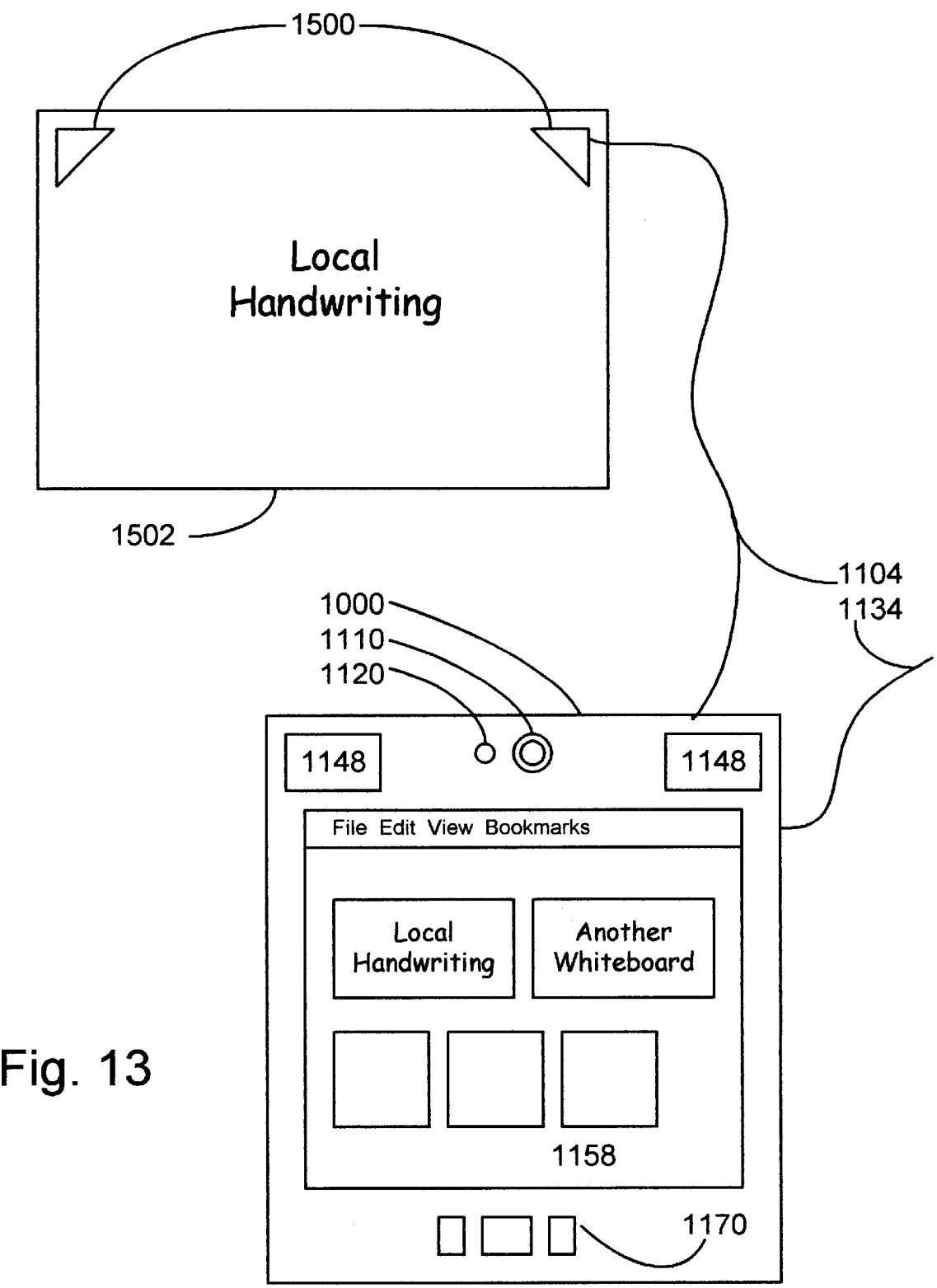
FIG. 13 depicts an application of further embodiment 1000 of FIG. 10 using a touch pad selector device employing a wireless data capture device 1500 and supporting a windowing system which in turn supports a web browser.

FIG. 13 depicts an application of further embodiment 1000 of FIG. 10 using a touch pad selector device employing a wireless data capture device 1500 and supporting a windowing system which in turn supports a web browser.

Portable conference center 1000 wireless data capture interface 1100 of FIG. 1 is coupled 1104 to wireless data capture device 1500. Wireless data capture device 1500 is situated proximate to a white board 1502 in certain applications. Wireless data capture device 1500 is situated proximate to a back projection system 1502 in certain applications. Wireless data capture device 1500 is situated proximate to a flat panel display 1502 in certain applications.

In certain embodiments, wireless data capture coupling 1104 supports a wireline physical transport layer. In certain further embodiments, wireless data capture coupling 1104 physical transport layer includes a fiber optic component. In further embodiments, wireless data capture coupling 1104 physical transport layer includes a twisted pair component. In further embodiments, wireless data capture coupling 1104 physical transport layer includes a standardized bus component.

In certain embodiments, wireless data capture coupling 1104 supports a wireless physical transport layer. In certain further embodiments, wireless data capture coupling 1104 physical transport layer interacts in the infra-red spectrum. In other further embodiments, wireless data capture coupling 1104 physical transport layer interacts in the radio spectrum. In certain further embodiments, wireless data capture coupling 1104 physical transport layer interacts in the radio spectrum supporting at least part of the Bluetooth standard.

The network interface 1130 is coupled 1034 to an external network. In certain embodiments, network coupling 1134 supports a wireline physical transport layer. In certain further embodiments, the network coupling 1134 physical transport layer includes a fiber optic component. In further embodiments, the network coupling 1134 physical transport layer includes a twisted pair component. In other further embodiments, the network coupling 1134 physical transport layer includes a coaxial cable component.

In certain embodiments, network coupling 1134 supports a wireless physical transport layer. In certain further embodiments, the network coupling 1134 physical transport layer interacts in the infra-red spectrum. In other further embodiments, the network coupling 1134 physical transport layer interacts in the radio spectrum. In further embodiments, the network coupling 1134 radio spectrum physical transport layer interacts in the microwave spectrum.

In certain embodiments, network interface 1130 coupling 1132 includes a standard computer bus. In certain further embodiments, network interface coupling 1132 is at least partially compliant with the standardized bus. In other further embodiments, network interface coupling 1132 is the PCMCIA bus and network interface 1130 is a PCMCIA bus card.

In certain embodiments, the selector device 1170 and video display 1158 may be proximate. In certain further embodiments, selector device 1170 may include a touch pad. In certain embodiments, selector device 1170 may be located proximate to video display 1158. Certain further embodiments may locate selector device 1170 above, below, to the right or left of video display 1158.

Figure 14:
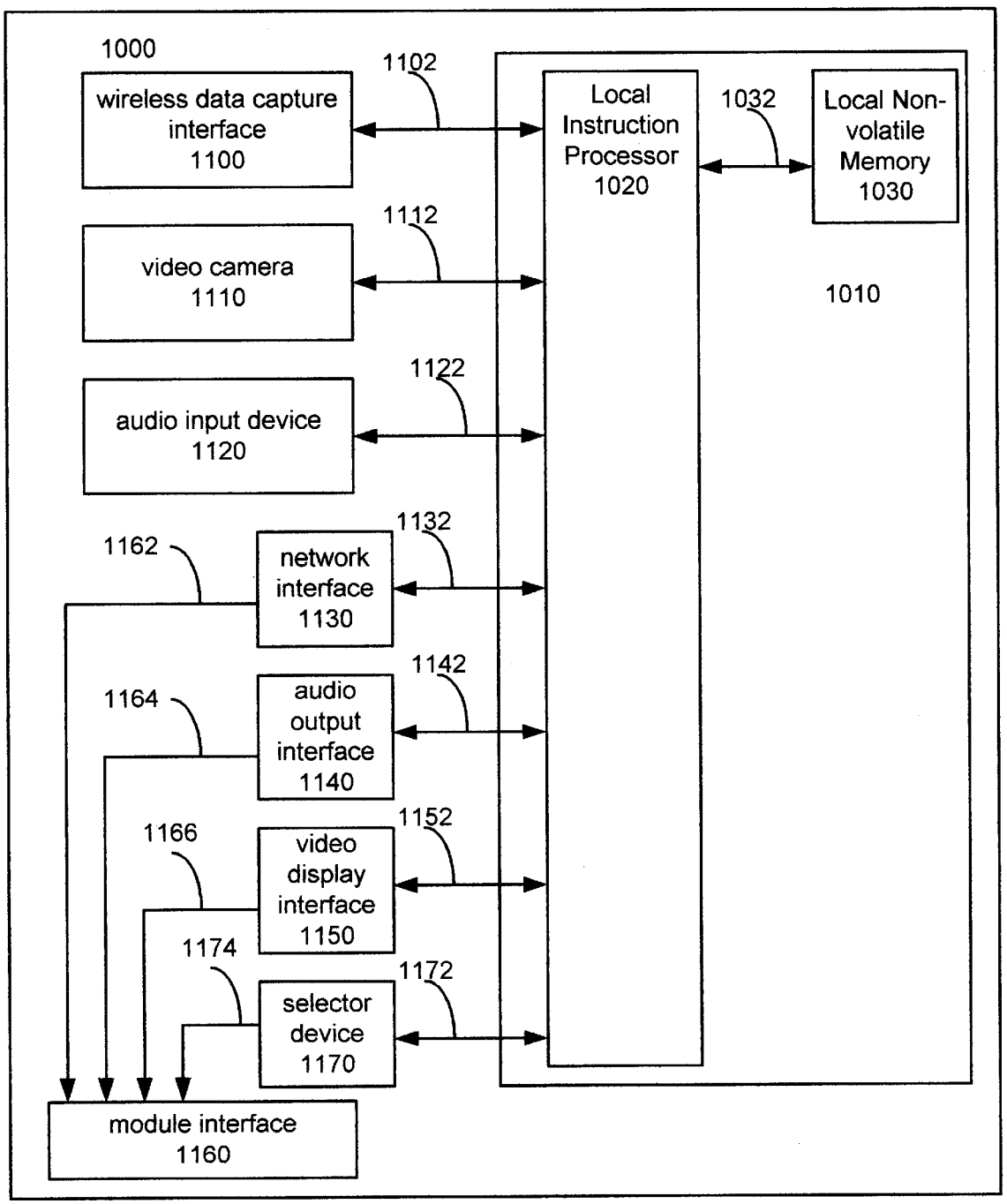
FIG. 14 depicts a system block diagram of a further embodiment 1000 of FIGS. 8 and 4 incorporating a selector device effected through the module interface in accordance with an aspect of the invention.

FIG. 14 depicts a system block diagram of a further embodiment 1000 of FIGS. 8 and 4 incorporating a selector device effected through a module interface in accordance with an aspect of the invention.

As in FIG. 1, portable conference center 1000 includes a processor 1010. Processor 1010 is coupled 1102 with wireless data capture interface 1100. Processor 1010 is coupled 1112 with video camera 1110. Processor 1010 is coupled 1122 with audio input device 1120. Processor 1010 is coupled 1132 with network interface 1130. Processor 1010 is coupled 1142 with audio output interface 1140. Processor 1010 is coupled 1152 with video display interface 1150.

As in FIG. 1, processor 1010 includes local instruction processor 1020 accessing 1032 local non-volatile memory 1030 to execute program code segments. Local instruction processor 1020 is coupled 1102 with wireless data capture interface 1100. Local instruction processor 1020 is coupled 1112 with video camera 1110. Local instruction processor 1020 is coupled 1122 with audio input device 1120. Local instruction processor 1020 is coupled 1132 with network interface 1130. Local instruction processor 1020 is coupled 1142 with audio output interface 1140. Local instruction processor 1020 is coupled 1152 with video display interface 1150.

As in FIG. 4, portable conference center 1000 includes a module interface 1160, coupled to at least one of the following interfaces. Network interface 1130 couples 1162 to module interface 1160. Audio output interface 1140 couples 1164 to module interface 1160. Video display interface 1150 coupled 1166 to module interface 1160.

In distinction with FIGS. 1, 4 and 10, selector device 1170 is coupled 1174 to module interface 1160. For the sake of simplicity the following discussion will assume the four interfaces are coupled but all combinations of couplings of the first three interfaces plus coupling of the selector device 1170 are considered within the intended scope of the invention.

In certain embodiments, module interface 1160 supports a computer bus. In certain further embodiments, module interface 1160 supports a live insertion and removal computer bus. In certain further embodiments, module interface 1160 supports at least part of the PCMCIA standard.

In certain embodiments, network interface 1130 couples 1162 as an addressable entity on the module interface 1160. In certain embodiments, audio output interface 1140 couples 1164 as an addressable entity on the module interface 1160. In certain embodiments, video display interface 1150 couples 1166 as an addressable entity on the module interface 1160.

In certain embodiments, module interface 1160 supports a wireline physical transport layer. In certain further embodiments, module interface 1160 physical transport layer support includes fiber optic cable. In further embodiments, module interface 1160 physical transport layer support includes fiber channel. In other further embodiments, module interface 1160 physical transport layer support includes coaxial cable. In other further embodiments, module interface 1160 physical transport layer support includes multi-wire cabling. In other further embodiments, module interface 1160 physical transport layer support includes ATM protocols.

Figure 15:
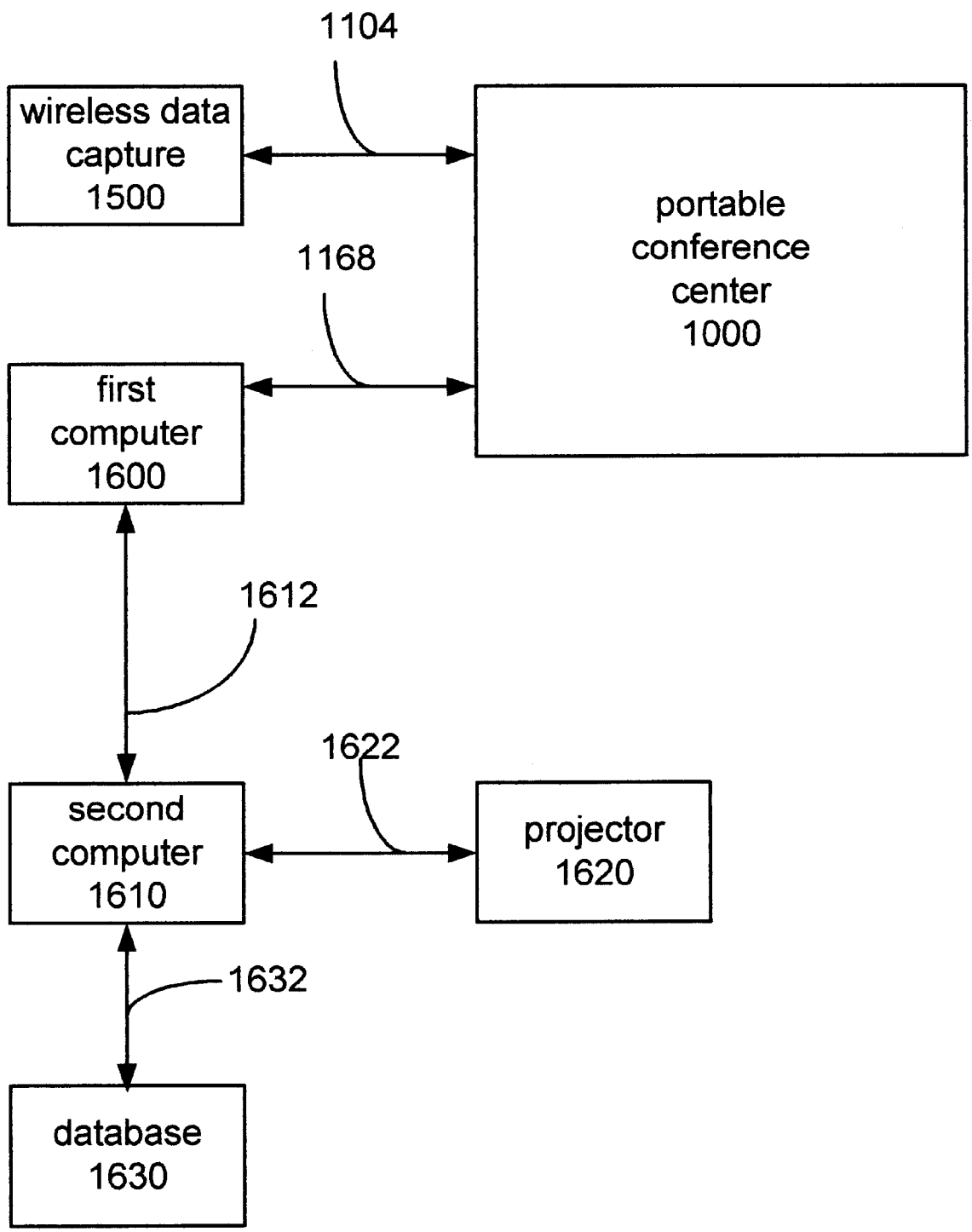
FIG. 15 depicts an application system block diagram of certain embodiments 1000 utilizing a module interface connection 1168 from a first computer 1600 coupled 1612 to a second computer 1610, which in turn drives 1622 a projector 1620 and accesses 1632 a database 1630 in accordance with an aspect of the invention.

FIG. 15 depicts an application system block diagram of certain embodiments 1000 utilizing a module interface connection 1168 from a first computer 1600 coupled 1612 to a second computer 1610, which in turn drives 1622 a projector 1620 and accesses 1632 a database 1630 in accordance with an aspect of the invention.

Portable conference center 1000 using wireless data capture interface 1100 is coupled 1104 to wireless data capture device 1500. Portable conference center 1000 using module interface 1160 couples 1168 to first computer 1600.

First computer 1600 couples 1612 to second computer 1610. In certain circumstances coupling 1612 is a network connection. In certain further circumstances, the network coupling 1612 is within a LAN. In certain further circumstances, the network coupling 1612 traverses a firewall. Second computer 1610 drives 1622 projector 1620. Second computer 1610 accesses 1632 database 1630. Database 1630 may be contained in second computer Is 1610 in certain circumstances. Database 1630 may be accessed across a network by second computer 1610.

Note that in certain cases it is advantageous for either first computer 1600 or second computer 1610 to store the audio-video streams and/or audio-video data streams either in whole or in part for later use. This is advantageous for many circumstances, such as classrooms, lectures, or other presentations.

Figure 16:
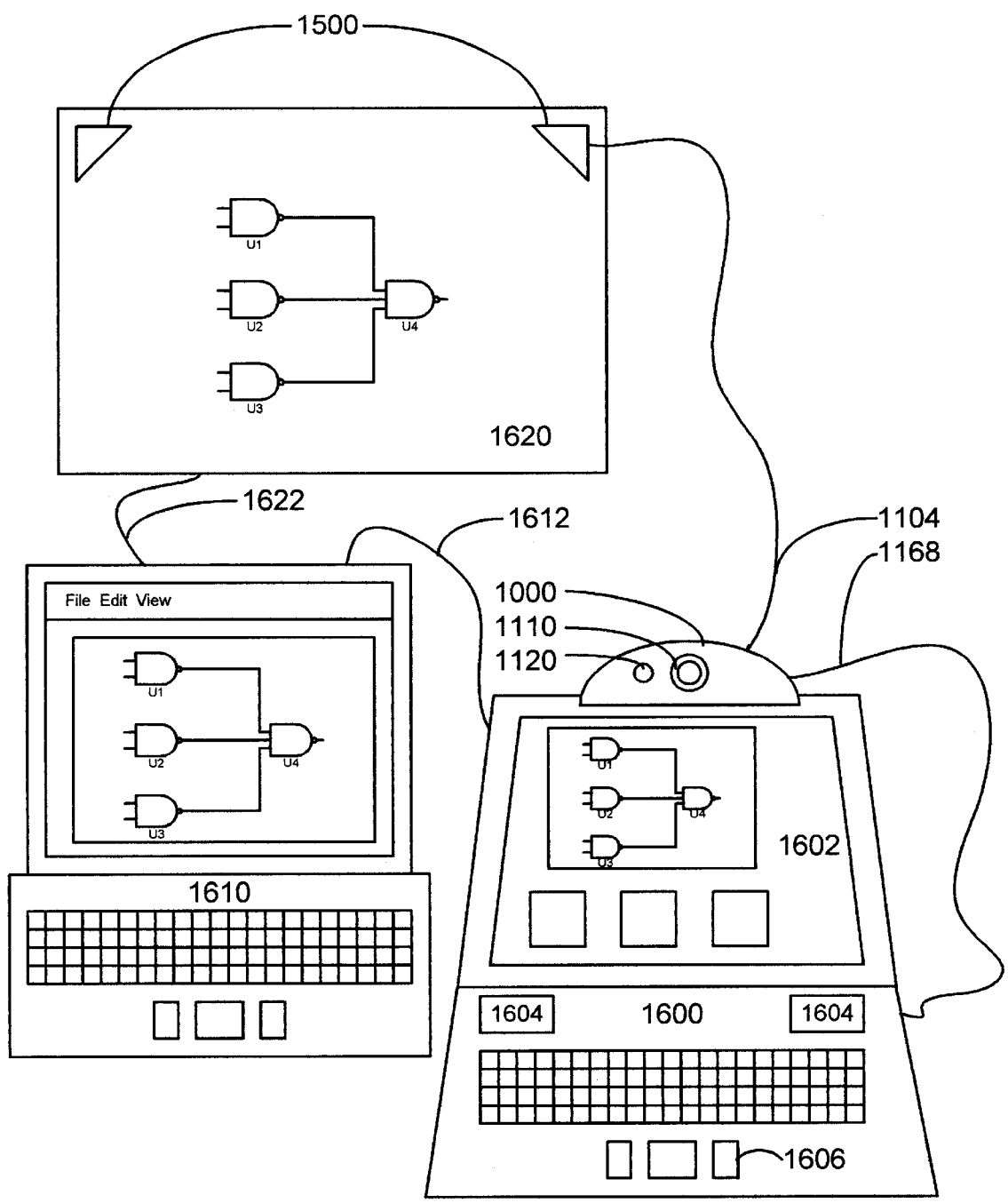
FIG. 16 depicts a system application based upon the application system block diagram of FIG. 15 using a back projector 1620 in accordance with an aspect of the invention.

FIG. 16 depicts a system application based upon the application system block diagram of FIG. 15 using a back projector 1620 in accordance with an aspect of the invention.

Portable conference center 1000 wireless data capture interface 1100 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

Portable conference center 1000 module interface 1160 couples 1168 to first computer 1600. First computer 1600 includes a first computer display device 1602, first computer audio output devices 1604 and a selector device 1606. Portable conference center 1000 video display interface 1150 traverses module coupling 1168 to drive at least part of the first computer display 1602. Portable conference center 1000 audio output interface 1150 traverses module coupling 1168 to drive at least part of the audio output devices 1604. Local instruction processor 1020 accesses selector device 1170 via 1174 module interface 1160 coupling 1168 to first computer 1600 and presents data by first computer selector device 1606.

First computer 1600 couples 1612 to second computer 1610. In certain circumstances coupling 1612 is a network connection. In certain further circumstances, the network coupling 1612 is within a LAN. In certain further circumstances, the network coupling 1612 traverses a firewall. Second computer 1610 drives 1622 back projector 1620. Second computer 1610 accesses 1632 database 1630.

In certain situations, back projector 1620 is a flat panel display. In other situations, back projector 1620 is a large television set. In other situations, back projector 1620 is a television supporting HDTV.

The wireless data capture device 1500 is used in this application to capture a wireless mouse. Wireless data capture coupling 1104 sends a stream of information to wireless data capture interface 1100. The local audio video data stream processing program code segment 1422 residing in the local nonvolatile memory 1030 is accessed 1032 and executed by local instruction processor 1020 to create the local audio video data stream in virtual mouse mode. The local audio video data stream is sent 1432 by local instruction processor 1020 through network interface 1130 through module interface 1160 across physical transport layer 1168 to the first computer 1600.

Second computer 1610 generates a graphical representation of accessed elements based upon the virtual mouse stream extracted from the local audio video data stream generated in first computer 1600. The graphical representation is processed to create a second video stream and to modify the database 1630. The second video stream is sent via 1612 to first computer 1600 where it is displayed with the combined effect of the virtual mouse sensed by the wireless data capture device 1500 as part of the local audio video data stream by portable conference center 1000 and sent via 1168 to first computer 1600.

Figure 17:
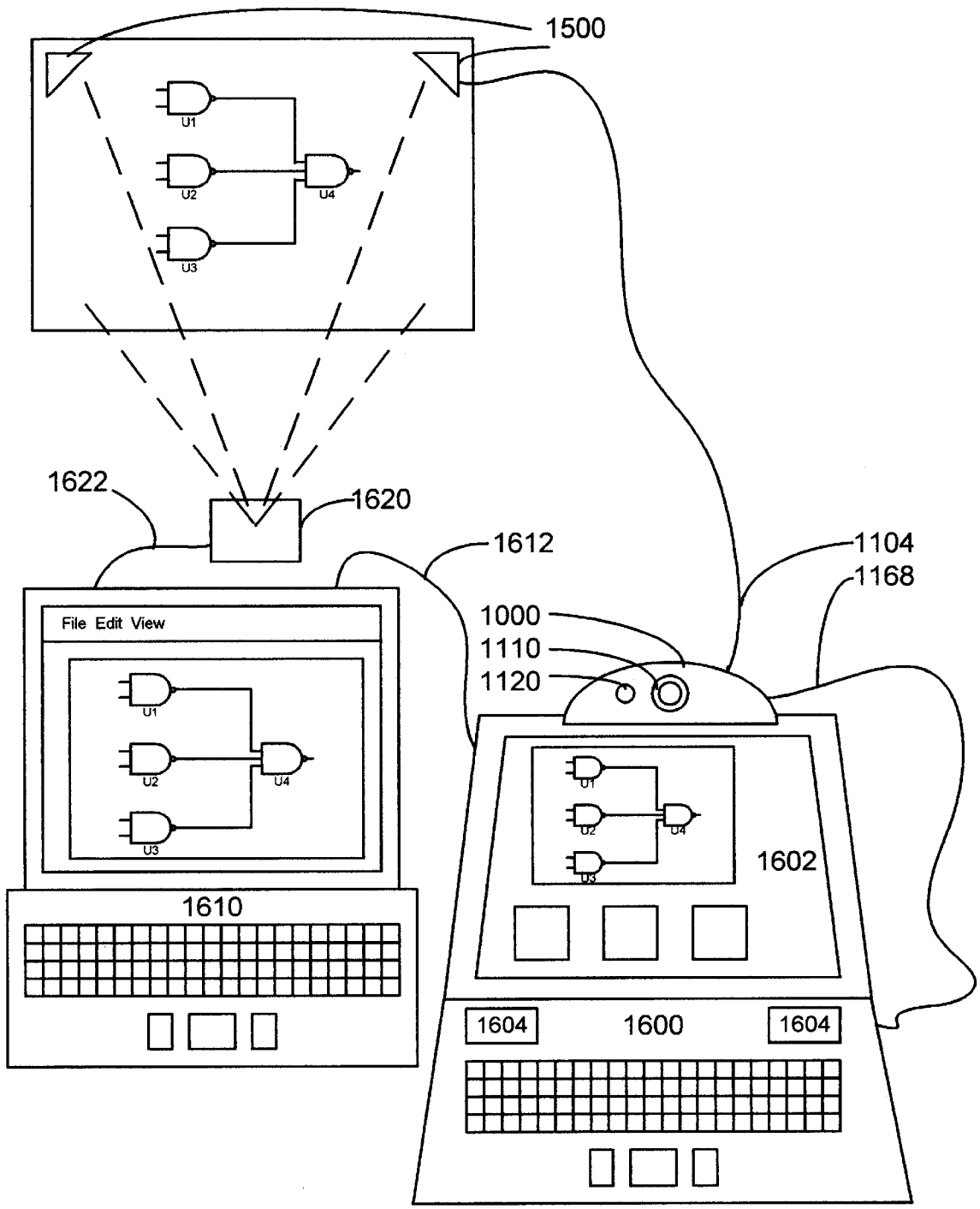
FIG. 17 depicts a system application based upon the application system block diagram of FIG. 15 using a front projector 1620 in accordance with an aspect of the invention.

FIG. 17 depicts a system application based upon the application system block diagram of FIG. 15 using a front projector 1620 in accordance with an aspect of the invention. The description given for FIG. 16 is applicable in its entirety for this figure with the projector 1620 being a front projector rather than back projector as in FIG. 16.

Figure 18:
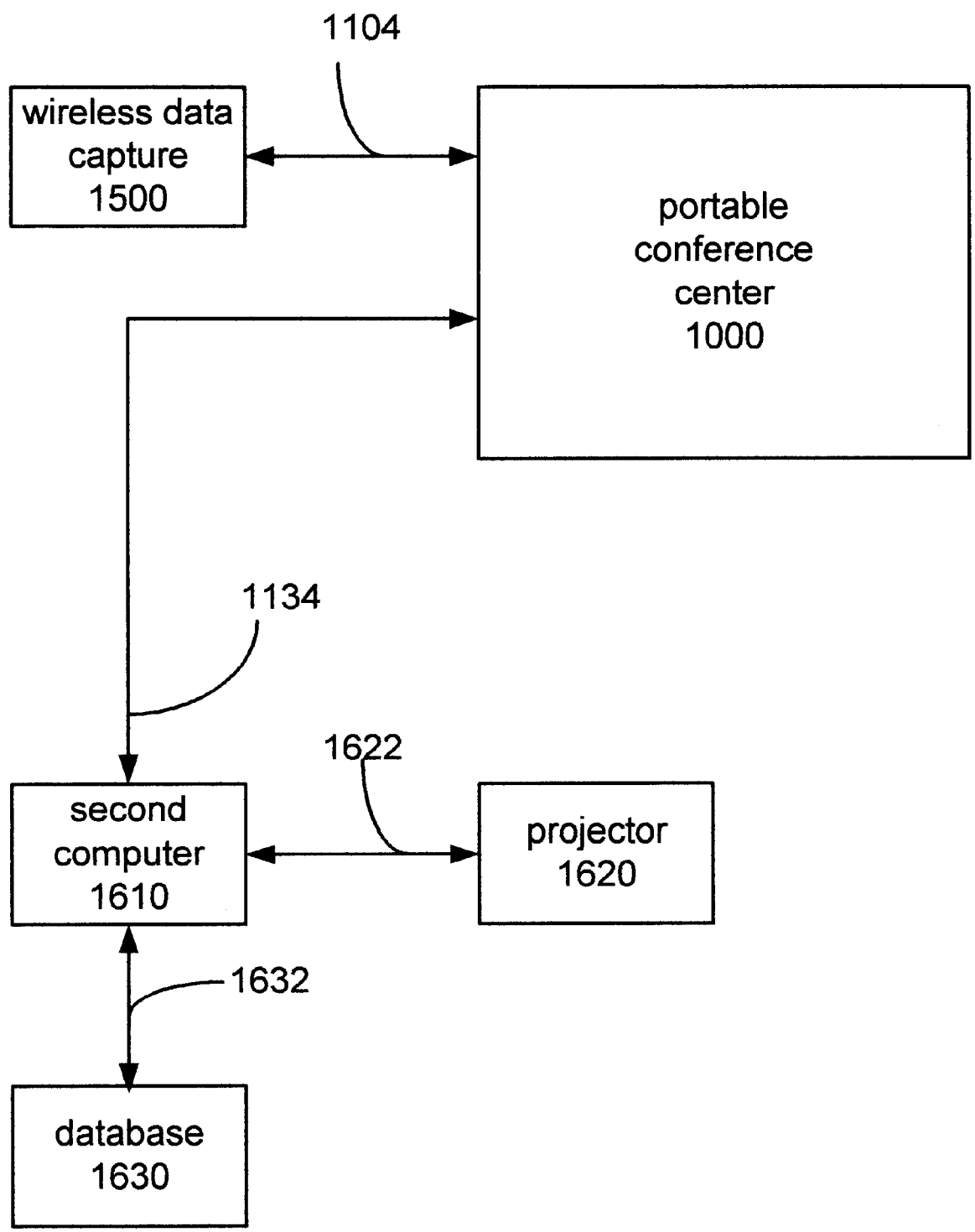
FIG. 18 depicts an application system block diagram of certain embodiments 1000 utilizing the network interface coupled 1134 to a second computer 1610, which in turn drives 1622 a projector 1620 and accesses 1632 a database 1630 in accordance with an aspect of the invention.

FIG. 18 depicts an application system block diagram of certain embodiments 1000 utilizing the network interface coupled 1134 to a second computer 1610, which in turn drives 1622 a projector 1620 and accesses 1632 a database 1630 in accordance with an aspect of the invention.

Portable conference center 1000 using wireless data capture interface 1100 is coupled 1104 to wireless data capture device 1500. Portable conference center 1000 using network interface 1130 couples 1134 to second computer 1610.

In certain circumstances coupling 1134 is a network connection. In certain further circumstances, the network coupling 1134 is within a LAN. In certain further circumstances, the network coupling 1134 traverses a firewall. Second computer 1610 drives 1622 projector 1620. Second computer 1610 accesses 1632 database 1630. Database 1630 may be contained in second computer 1610 in certain circumstances. Database 1630 may be accessed across a network by second computer 1610.

Figure 19:
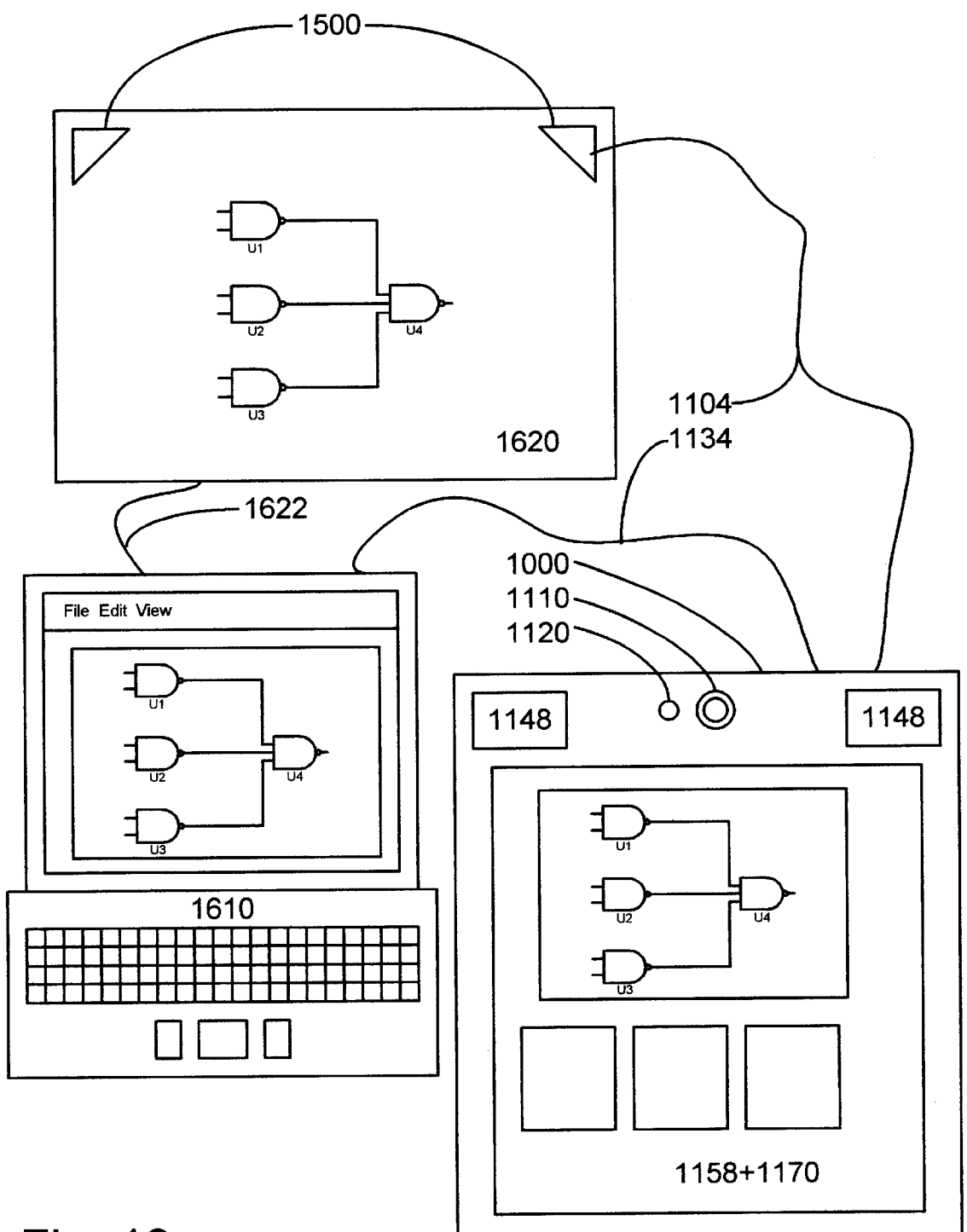
FIG. 19 depicts a system application based upon the application system block diagram of FIG. 18 using a back projector 1620 in accordance with an aspect of the invention.

FIG. 19 depicts a system application based upon the application system block diagram of FIG. 18 using a back projector 1620 in accordance with an aspect of the invention.

Portable conference center 1000 wireless data capture interface 1100 is coupled 1104 to wireless data capture device 1500. Wireless data capture device 1500 is situated proximate to a white board 1502 in certain embodiments. Wireless data capture device 1500 is situated proximate to a back projection system 1502 in certain embodiments. Wireless data capture device 1500 is situated proximate to a flat panel display 1502 in certain embodiments.

Portable conference center 1000 using wireless data capture interface 1100 is coupled 1104 to wireless data capture device 1500. Portable conference center 1000 using network interface 1130 couples 1134 to second computer 1610. In certain circumstances coupling 1134 is a network connection. In certain further circumstances, the network coupling 1134 is within a LAN. In certain further circumstances, the network coupling 1134 traverses a firewall. Second computer 1610 drives 1622 back projector 1620. Second computer 1610 accesses 1632 database 1630.

In certain situations, back projector 1620 is a flat panel display. In other situations, back projector 1620 is a large television set. In other situations, back projector 1620 is a television supporting HDTV.

The wireless data capture device 1500 is used in this application to capture a wireless mouse. Wireless data capture coupling 1104 sends a stream of information to wireless data capture interface 1100. The local audio video data stream processing program code segment 1422 residing in the local nonvolatile memory 1030 is accessed 1032 and executed by local instruction processor 1020 to create the local audio video data stream in virtual mouse mode.

Second computer 1610 generates a graphical representation of accessed elements based upon the virtual mouse stream extracted from the local audio video data stream generated in portable conference center 1000. The graphical representation is processed to create a second video stream and to modify the database 1630. The second video stream is sent via 1134 to portable conference center 1000 where it is displayed with the combined effect of the virtual mouse sensed by the wireless data capture device 1500 as part of the local audio video data stream by portable conference center 1000 and sent via 1168 to portable conference center 1000.

Figure 20:
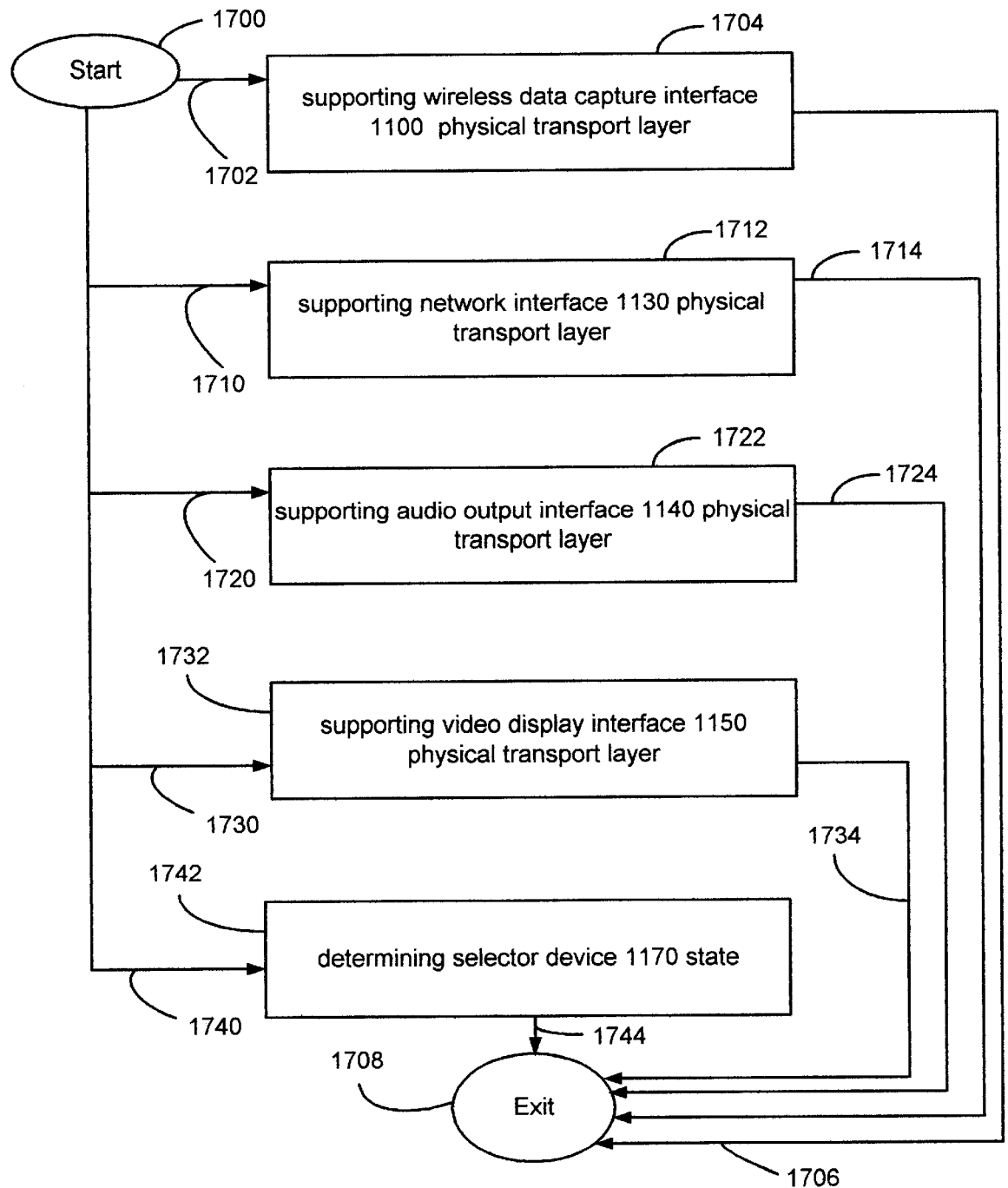
FIG. 20 depicts a flowchart of several program code segments supporting the physical transport layers of the interfaces of the portable conference center in accordance with aspects of the invention.

FIG. 20 depicts a flowchart of several program code segments supporting the physical transport layers of the interfaces of the portable conference center in accordance with aspects of the invention.

Operation 1700 starts the operations of this flowchart. Arrow 1702 directs the flow of execution from operation 1700 to operation 1704. Operation 1704 performs supporting the wireless data capture interface physical transport layer. Arrow 1706 directs execution from operation 1704 to operation 1708. Operation 1708 terminates the operations of this flowchart. In certain embodiments, operation 1704 supports a wireline physical transport layer. In certain embodiments, operation 1704 supports a wireless physical transport layer. In certain further embodiments, operation 1704 supports interactions in the infra-red spectrum. In other further embodiments, operation 1704 supports interactions in the radio spectrum. In further embodiments, operation 1704 supports interactions at least partially compatible with the Bluetooth standard.

Arrow 1710 directs the flow of execution from starting operation 1700 to operation 1712. Operation 1712 performs supporting network interface 1120 physical transport layer. Arrow 1714 directs execution from operation 1712 to operation 1708. Operation 1708 terminates the operations of this flowchart. In certain embodiments, operation 1712 supports a wireline physical transport layer. In certain embodiments, operation 1712 supports a wireless physical transport layer. In certain embodiments, operation 1712 supports an ATM compatible physical transport layer.

Arrow 1720 directs the flow of execution from starting operation 1700 to operation 1722. Operation 1722 performs supporting audio output interface 1140 physical transport layer. Arrow 1724 directs execution from operation 1722 to operation 1708. Operation 1708 terminates the operations of this flowchart. In certain embodiments, operation 1722 supports digital signaling. In certain embodiments, operation 1722 supports analog signaling.

Arrow 1730 directs the flow of execution from starting operation 1700 to operation 1732. Operation 1732 performs supporting video display interface 1150 physical transport layer. Arrow 1734 directs execution from operation 1732 to operation 1708. Operation 1708 terminates the operations of this flowchart. In certain embodiments, operation 1732 supports flat panel protocols. In certain embodiments, operation 1732 supports RGB compatible signals. In certain embodiments, operation 1732 supports PAL compatible signals. In certain embodiments, operation 1732 supports HDTV compatible signals. In certain embodiments, operation 1732 supports analog signaling. In certain embodiments, operation 1732 supports digital signaling.

Arrow 1740 directs the flow of execution from starting operation 1700 to operation 1742. Operation 1742 performs determining selector device 1170 state. Arrow 1744 directs execution from operation 1742 to operation 1708. Operation 1708 terminates the operations of this flowchart. In certain embodiments, operation 1742 uses transfers via module interface 1160 to an external computer selector device as the raw data to determine selector device state. In certain other embodiments, operation 1742 examines the local audio stream to determine selector states. In certain embodiments, operation 1742 uses local selector device reading to determine the selector device state.

Figure 21:
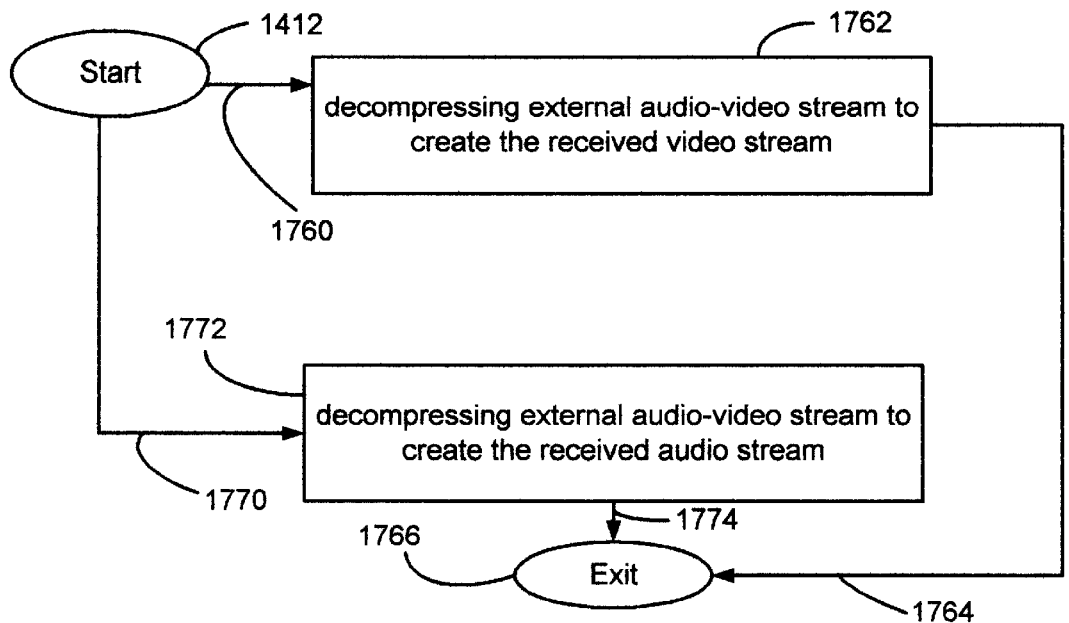
FIG. 21 depicts a detail flowchart of operation 1412 supporting decompression of an external audio-video stream in accordance with some aspects of the invention.

FIG. 21 depicts a detail flowchart of operation 1412 supporting decompression of an external audio-video stream in accordance with some aspects of the invention.

Arrow 1760 directs the flow of execution from starting operation 1412 to operation 1762. Operation 1762 performs decompressing the external audiovideo stream to create the received video stream. Arrow 1764 directs execution from operation 1762 to operation 1766. Operation 1766 terminates the operations of this flowchart.

Arrow 1770 directs the flow of execution from starting operation 1412 to operation 1772. Operation 1772 performs decompressing the external audiovideo stream to create the received audio stream. Arrow 1774 directs execution from operation 1772 to operation 1766. Operation 1766 terminates the operations of this flowchart.

Note that certain embodiments may include but are not limited by a preprocessing operation which partitions the audio and video into separate streams.

Figure 22:
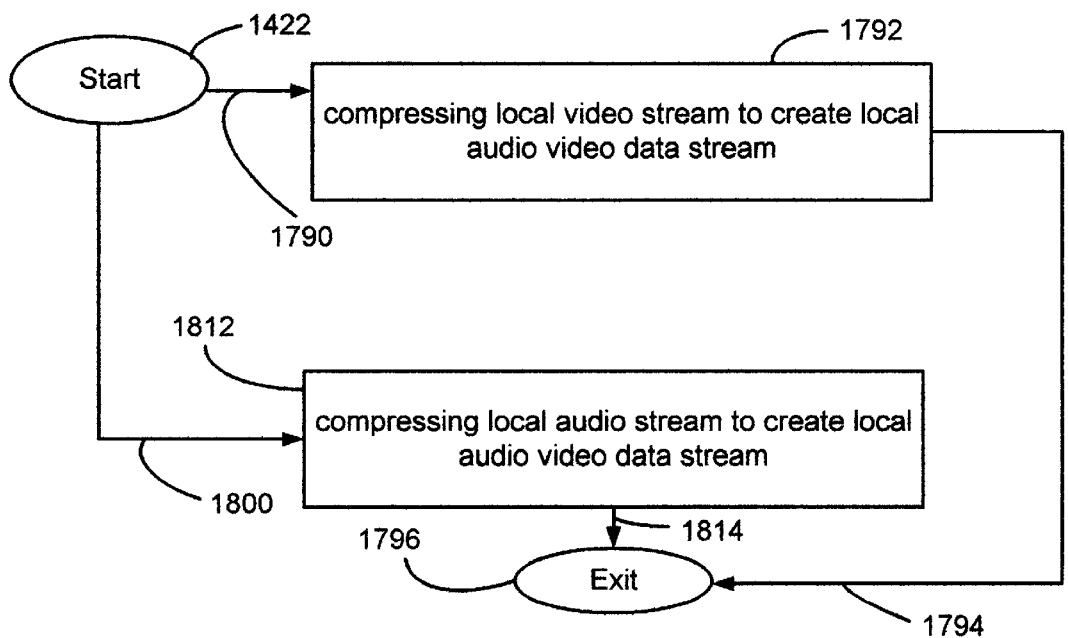
FIG. 22 depicts a detail flowchart of operation 1422 supporting compression of the local audio and local video streams in accordance with some aspects of the invention.

FIG. 22 depicts a detail flowchart of operation 1422 supporting compression of the local audio and local video streams in accordance with some aspects of the invention.

Arrow 1790 directs the flow of execution from starting operation 1422 to operation 1792. Operation 1792 performs compressing the local video stream to create the local audio video data stream. Arrow 1794 directs execution from operation 1792 to operation 1796. Operation 1796 terminates the operations of this flowchart.

Arrow 1800 directs the flow of execution from starting operation 1422 to operation 1802. Operation 1802 performs compressing the local audio stream to create the local audio video data stream. Arrow 1804 directs execution from operation 1802 to operation 1796. Operation 1796 terminates the operations of this flowchart.

Figure 23:
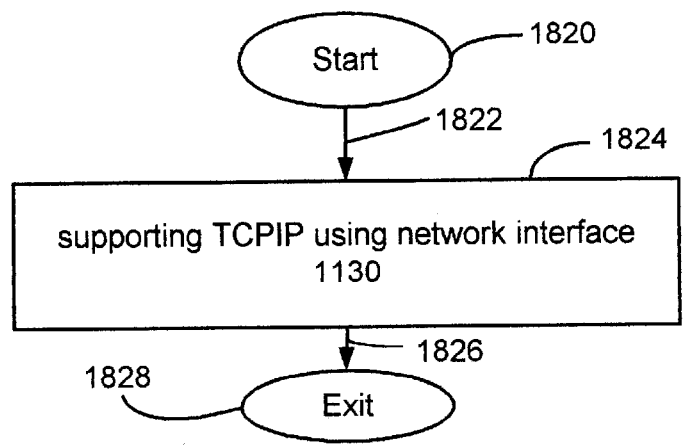
FIG. 23 depicts a flowchart showing supporting for TCPIP protocols across the network interface 1160 in accordance with an aspect of the invention.

FIG. 23 depicts a flowchart showing supporting for TCPIP protocols across the network interface 1160 in accordance with an aspect of the invention.

Operation 1820 starts the operations of this flowchart. Arrow 1822 directs the flow of execution from operation 1820 to operation 1824. Operation 1824 performs supporting TCPIP using the network interface 1130. Arrow 1826 directs execution from operation 1824 to operation 1828. Operation 1828 terminates the operations of this flowchart.

Figure 24:
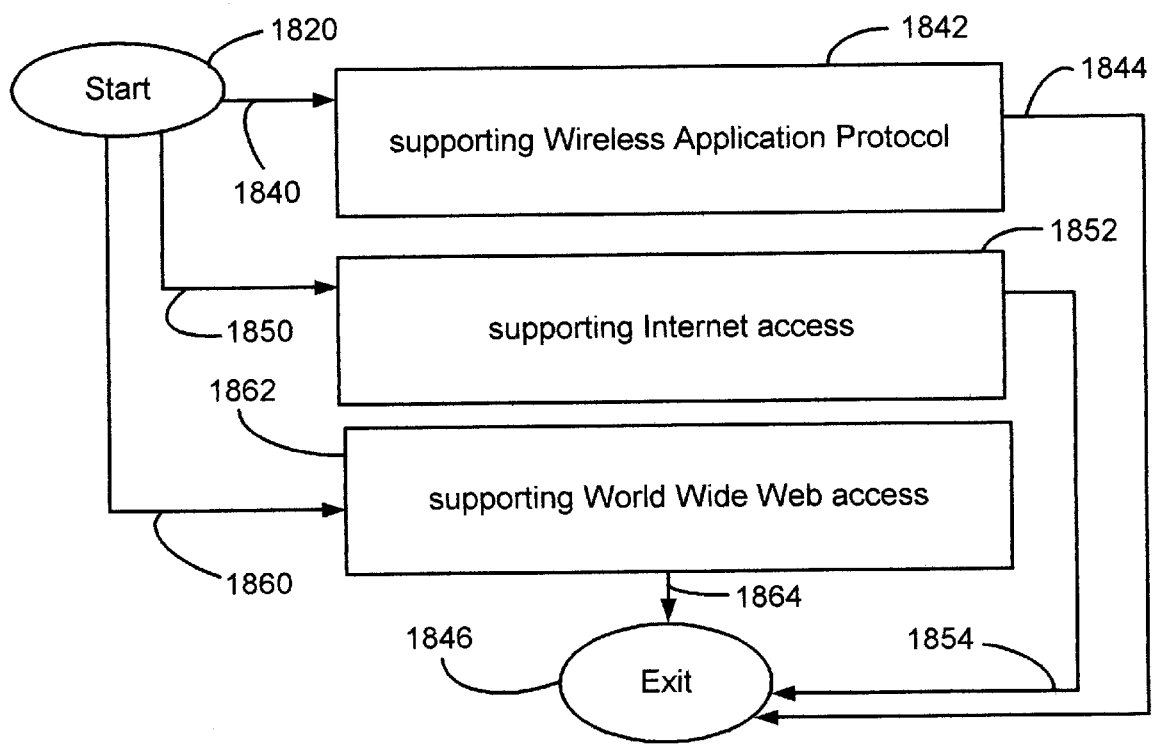
FIG. 24 depicts a detail flowchart of operation 1824 supporting one or more of Wireless Application Protocol, Internet access and access to the World Wide Web.

FIG. 24 depicts a detail flowchart of operation 1824 supporting one or more of Wireless Application Protocol, Internet access and access to the World Wide Web.

Arrow 1840 directs the flow of execution from starting operation 1824 to operation 1842. Operation 1842 performs supporting the Wireless Application Protocol. Arrow 1844 directs execution from operation 1842 to operation 1846. Operation 1846 terminates the operations of this flowchart.

Arrow 1850 directs the flow of execution from starting operation 1824 to operation 1852. Operation 1852 performs supporting Internet access. Arrow 1854 directs execution from operation 1852 to operation 1846. Operation 1846 terminates the operations of this flowchart.

Arrow 1860 directs the flow of execution from starting operation 1824 to operation 1862. Operation 1862 performs supporting World Wide Web access.

Arrow 1864 directs execution from operation 1862 to operation 1846. Operation 1846 terminates the operations of this flowchart.

The preceding embodiments have been provided by way of example and are not meant to constrain the scope of the following claims.

What is claimed is:

1. A portable video conference module supporting a network-based video conference, comprising:
   a processor further comprising a local instruction processor accessing a local non-volatile memory;
   a wireless data capture interface coupled to a processor;
   a video camera coupled to the processor;
   a video display interface coupled to the processor;
   an audio input device coupled to the processor;
   an audio output interface coupled to the processor; and
   a network interface coupled to the processor;
   wherein the local instruction processor is coupled to the audio input device and is coupled to the audio output interface;
   wherein the local instruction processor is coupled to the video camera and is coupled to the video display interface;
   wherein the local instruction processor is coupled to the network interface; and
   wherein the local instruction processor executes program code segments residing in the local non-volatile memory including:
      a program code segment for initializing a local audio video data stream of the video conference;
      a program code segment for repeatedly receiving from the network interface an external audio-video stream to create a received video stream presented to the video display interface and to create a received audio stream presented to the audio output interface;
      a program code segment for receiving a local video stream from the video camera and receiving a local audio stream from the audio input device and receiving the wireless data capture state from the wireless data capture interface to create a local audio video data stream; and
      a program code segment for sending the local audio video data stream to the network interface;
   wherein the local processor executes the program code segment residing in local non-volatile memory for receiving the local video stream from the video camera and receiving the local audio stream from the audio input device and receiving the wireless capture data capture state from the wireless data capture interface to create the local audio video data stream and
   further includes one of a program code segment for compressing the local video stream to create the local audio video data stream and a program code segment for compressing the local audio stream to create the local audio video data stream.

2. A portable video conference module supporting a network-based video conference as recited in claim 1
   further comprising a module interface coupling the portable video conference module to a computer containing a display device and audio output device;
   wherein the received video stream presented to the video display interface includes sending the received video steam via the module interface to the computer for presentation to the display device;
   wherein the received audio stream presented to the audio output interface includes sending the received audio stream via the module interface to the computer for presentation to the audio output device of the computer.

3. A portable video conference module supporting a network-based video conference as recited in claim 2
   wherein the computer further includes an external network interface; and
   wherein communication with the network interface is through the module interface with the external network interface.

4. A portable video conference module supporting a network-based video conference as recited in claim 2 further comprises a mechanical attachment mechanism able to mechanically attach the portable video conference module to the computer.

5. A portable video conference module supporting a network-based video conference as recited in claim 4 wherein the computer is a portable computer.

6. A portable video conference module supporting a network-based video conference as recited in claim 2 wherein the module interface includes a standard computer interface.

7. A portable video conference module supporting a network-based video conference as recited in claim 2 wherein the module interface includes a USB interface.

8. A portable video conference module supporting a network-based video conference as recited in claim 2 wherein the module interface includes a PCMCIA interface.

9. A portable video conference module supporting a network-based video conference as recited in claim 1 further comprising a compression accelerator coupled to the local instruction processor.

10. A portable video conference module supporting a network-based video conference as recited in claim 9 wherein the video camera coupled to the local instruction processor includes the video camera coupled to the compression accelerator.

11. A portable video conference module supporting a network-based video conference as recited in claim 1 further comprising video display ram coupled to the video display interface.

12. A portable video conference module supporting a network-based video conference as recited in claim 11 further comprising a decompression accelerator coupled to the local instruction processor.

13. A portable video conference module supporting a network-based video conference as recited in claim 12 wherein the local instruction processor coupled to the video display interface further comprises the decompression accelerator coupled to the video display interface.

14. A portable video conference module supporting a network-based video conference as recited in claim 13 wherein the compression accelerator coupled to the video display interface further comprises the video display ram coupled to the compression accelerator.

15. A portable video conference module supporting a network-based video conference as recited in claim 1 further comprising a video display coupled to the video display interface.

16. A portable video conference module supporting a network-based video conference as recited in claim 15 wherein the video display is a flat panel display.

17. A portable video conference module supporting a network-based video conference as recited in claim 15 further comprising a selector device coupled to the local instruction processor.

18. A portable video conference module supporting a network-based video conference as recited in claim 17 wherein the selector device includes a touch sensitive panel integrated with the video display.

19. A portable video conference module supporting a network-based video conference as recited in claim 1 wherein the portable video conference module weighs less than about 2.5 KG.

20. A portable video conference module supporting a network-based video conference as recited in claim 19 wherein the portable video conference module weighs less than about 2 KG.

21. A portable video conference module supporting a network-based video conference as recited in claim 20 wherein the portable video conference module weighs less than about 1.5 KG.

22. A portable video conference module supporting a network-based video conference as recited in claim 21 wherein the portable video conference module weighs less than about 1 KG.

23. A portable video conference module supporting a network-based video conference as recited in claim 22 wherein the portable video conference module weighs less than about 0.5 KG.

24. A portable video conference module supporting a network-based video conference as recited in claim 1 wherein the network interface supports a wireline physical transport layer.

25. A portable video conference module supporting a network-based video conference as recited in claim 1 wherein the network interface supports a wireless physical transport layer.

26. A portable video conference module supporting a network-based video conference as recited in claim 1 wherein the network interface supports a multi-channel access protocol.

27. A portable video conference module supporting a network-based video conference as recited in claim 26 wherein the multi-channel access protocol includes frequency modulation.

28. A portable video conference module supporting a network-based video conference as recited in claim 26 wherein the multi-channel access protocol includes time division.

29. A portable video conference module supporting a network-based video conference as recited in claim 26 wherein the multi-channel access protocol includes wavelet mechanisms.

30. A portable video conference module supporting a network-based video conference as recited in claim 26 wherein the multi-channel access protocol includes spread spectrum mechanisms.

31. A portable video conference module supporting a network-based video conference as recited in claim 30 wherein the multi-channel access protocol includes broadband spread spectrum mechanisms.

32. A portable video conference module supporting a network-based video conference as recited in claim 1 wherein the network interface supports a DSL communications protocol.

33. A portable video conference module supporting a network-based video conference as recited in claim 1 wherein the local instruction processor executes further program code segments including a program code segment using the network interface to support TCPIP.

34. A portable video conference module supporting a network-based video conference as recited in claim 33 the program code segment using the network interface to support TCPIP further includes a program code segment using the network interface to support the Wireless Application Protocol.

35. A portable video conference module supporting a network-based video conference as recited in claim 33 wherein the program code segment using the network interface to support TCPIP further includes a program code segment supporting the Internet.

36. A portable video conference module supporting a network-based video conference as recited in claim 35 wherein the program code segment using the network interface to support TCPIP further includes a program code segment supporting the World Wide Web.

37. A portable video conference module supporting a network-based video conference as recited in claim 1 wherein the network interface supports ATM.

38. A portable video conference module supporting a network-based video conference as recited in claim 1 wherein the audio output interface supports a digital protocol.

39. A portable video conference module supporting a network-based video conference as recited in claim 1 wherein the audio output interface supports an analog protocol.

40. A portable video conference module supporting a network-based video conference as recited in claim 1 further includes an audio output device coupled to the audio output interface.

41. A portable video conference module supporting a network-based video conference as recited in claim 1 wherein the wireless data capture interface employs a wireline physical transport layer to couple to a wireless data capture device.

42. A portable video conference module supporting a network-based video conference as recited in claim 1 wherein the wireless data capture interface employs a wireless physical transport layer to couple to a wireless data capture device.

43. A portable video conference module supporting a network-based video conference as recited in claim 42 wherein the wireless data capture interface wireless physical transport layer interacts in the infra-red spectrum.

44. A portable video conference module supporting a network-based video conference as recited in claim 1 wherein the wireless data capture interface wireless physical transport layer interacts in the radio spectrum.

45. A portable video conference module supporting a network-based video conference as recited in claim 1 wherein the wireless data capture interface wireless transport layer employing at least part of the Bluetooth communications protocol.

46. A portable video conference module supporting a network-based video conference as recited in claim 1 wherein the program code segments residing in the local non-volatile memory executed by the local instruction processor further includes a program code segment examining the local audio stream to effect user selections.

47. A portable video conference module supporting a network-based video conference as recited in claim 1 wherein the local instruction processor executes the program code segment residing in local non-volatile memory for repeatedly receiving from the network interface the external audio-video stream to create the received video stream presented to the video display interface and to create the received audio stream presented to the audio output interface further includes decompressing the external audio-video stream to create the received video stream.

48. A portable video conference module supporting a network-based video conference as recited in claim 1 wherein the local instruction processor executes the program code segment residing in local non-volatile memory for repeatedly receiving from the network interface the external audio-video stream to create the received video stream presented to the video display interface and to create the received audio stream presented to the audio output interface further includes decompressing the external audio-video stream to create the received audio stream.

49. A portable video conference module supporting a network-based video conference as recited in claim 1 wherein the program code segments residing in the local non-volatile memory executed by the local instruction processor further includes a program code segment maintaining a windowing system to the video display interface including a program code segment for presenting the received local video stream in at least one window in the windowing system;

a program code segment for presenting the wireless data capture state in a window in the windowing system.

50. A portable video conference module supporting a network-based video conference as recited in claim 49 wherein the program code segments residing in the local non-volatile memory executed by the local instruction processor further includes a program code segment maintaining a windowing system to the video display interface further includes a program code segment for supporting a web browser within the windowing system.

51. A portable video conference module supporting a network-based video conference as recited in claim 1 wherein the video display interface supports an analog video display protocol.

52. A portable video conference module supporting a network-based video conference as recited in claim 51 wherein the analog video display protocol video display interface supports NTSC.

53. A portable video conference module supporting a network-based video conference as recited in claim 51 wherein the analog video display protocol video display interface supports PAL.

54. A portable video conference module supporting a network-based video conference as recited in claim 1 wherein the video display interface supports a digital video display protocol.

55. A portable video conference module supporting a network-based video conference as recited in claim 54 wherein the digital video display protocol of the video display interface supports RGB.

56. A portable video conference module supporting a network-based video conference as recited in claim 1 wherein the video display interface supports HDTV.

57. A portable video conference module supporting a network-based video conference as recited in claim 1 wherein the video display interface supports flat panel displays.

58. A portable video conference module supporting a network-based video conference as recited in claim 1 wherein the video display interface supports flat panel displays, wherein the program code segment residing in the local non-volatile memory for initializing a local audio video data stream of the video conference executed the local instruction processor further includes a program code segment adjusting the video camera setup parameters for the video conference.

59. A portable video conference module supporting a network-based video conference as recited in claim 1 wherein the video display interface supports flat panel displays, wherein the program code segment residing in the local non-volatile memory for initializing a local audio video data stream of the video conference executed the local instruction processor further includes a program code segment adjusting parameters of the program code segment for receiving the local audio stream from the audio input device to minimize background noise and cancel echoes.

* * * * *